US012573067B2

(12) United States Patent
Keipour et al.

(10) Patent No.: US 12,573,067 B2
(45) Date of Patent: Mar. 10, 2026

(54) SHAPE AND POSE ESTIMATION FOR OBJECT PLACEMENT

(71) Applicant: Amazon Technologies, Inc., Seattle, WA (US)

(72) Inventors: Azarakhsh Keipour, Washington, DC (US); Dhruv Kool Rajamani, Washington, DC (US); Sicong Zhao, Seattle, WA (US); Tyler W Garaas, Boxford, MA (US); Avnish Sachar, North Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 192 days.

(21) Appl. No.: 18/602,983

(22) Filed: Mar. 12, 2024

(65) Prior Publication Data

US 2025/0292421 A1 Sep. 18, 2025

(51) Int. Cl.
| | |
|---|---|
| *G06T 7/543* | (2017.01) |
| *B25J 9/16* | (2006.01) |
| *B65G 1/137* | (2006.01) |
| *G06T 7/11* | (2017.01) |
| *G06T 7/13* | (2017.01) |
| *G06T 7/60* | (2017.01) |
| *G06T 7/73* | (2017.01) |
| *G06T 17/10* | (2006.01) |
| *G06V 10/44* | (2022.01) |

(52) U.S. Cl.
CPC ............ *G06T 7/543* (2017.01); *B25J 9/1697* (2013.01); *B65G 1/1375* (2013.01); *G06T 7/11* (2017.01); *G06T 7/13* (2017.01); *G06T 7/60* (2013.01); *G06T 7/73* (2017.01); *G06T 17/10* (2013.01); *G06V 10/44* (2022.01); *G06T 2207/20084* (2013.01); *G06T 2207/20092* (2013.01); *G06T 2207/30108* (2013.01)

(58) Field of Classification Search
None
See application file for complete search history.

(56) References Cited

U.S. PATENT DOCUMENTS

| | | | | |
|---|---|---|---|---|
| 2022/0375097 A1* | 11/2022 | Yu | .......................... | B25J 9/1697 |
| 2022/0410381 A1* | 12/2022 | Stoppi | ...................... | G06T 7/50 |
| 2023/0368414 A1* | 11/2023 | Afrooze | ................ | B25J 9/1697 |
| 2023/0410332 A1* | 12/2023 | Holzer | ...................... | G06T 7/97 |
| 2024/0203069 A1* | 6/2024 | Kim | ..................... | G06F 3/0346 |

* cited by examiner

*Primary Examiner* — Edward Martello
(74) *Attorney, Agent, or Firm* — Davis Wright Tremaine LLP

(57) ABSTRACT

Systems and methods are described relating to pose and shape estimation of objects. In some examples, a camera generates images depicting an object from different viewpoints. Within the images, a system identifies corners of the object, and the system uses these corners to generate lines that are projected from different viewpoints through the corners. Points may be identified by intersecting lines such that the points may be used to generate estimations of the object. The estimation with the highest score may be used to place the object in a location different from where the object was located.

20 Claims, 13 Drawing Sheets

206(1)

202

206(3)

204

206(4)

206(3)

800

900

DETECT AN OBJECT THAT NEEDS TO BE PLACED — 902

CAPTURE A SET OF IMAGES OF THE OBJECT — 904

PERFORM OBJECT ESTIMATION OF THE OBJECT USING THE SET OF IMAGES — 906

CONTROL FIRST ROBOT(S) TO PLACE THE OBJECT TO A DESIRED LOCATION USING POSE ESTIMATION OF THE OBJECT — 908

CONTROL SECOND ROBOT(S) TO MOVE A CONTAINER OF OBJECTS — 910

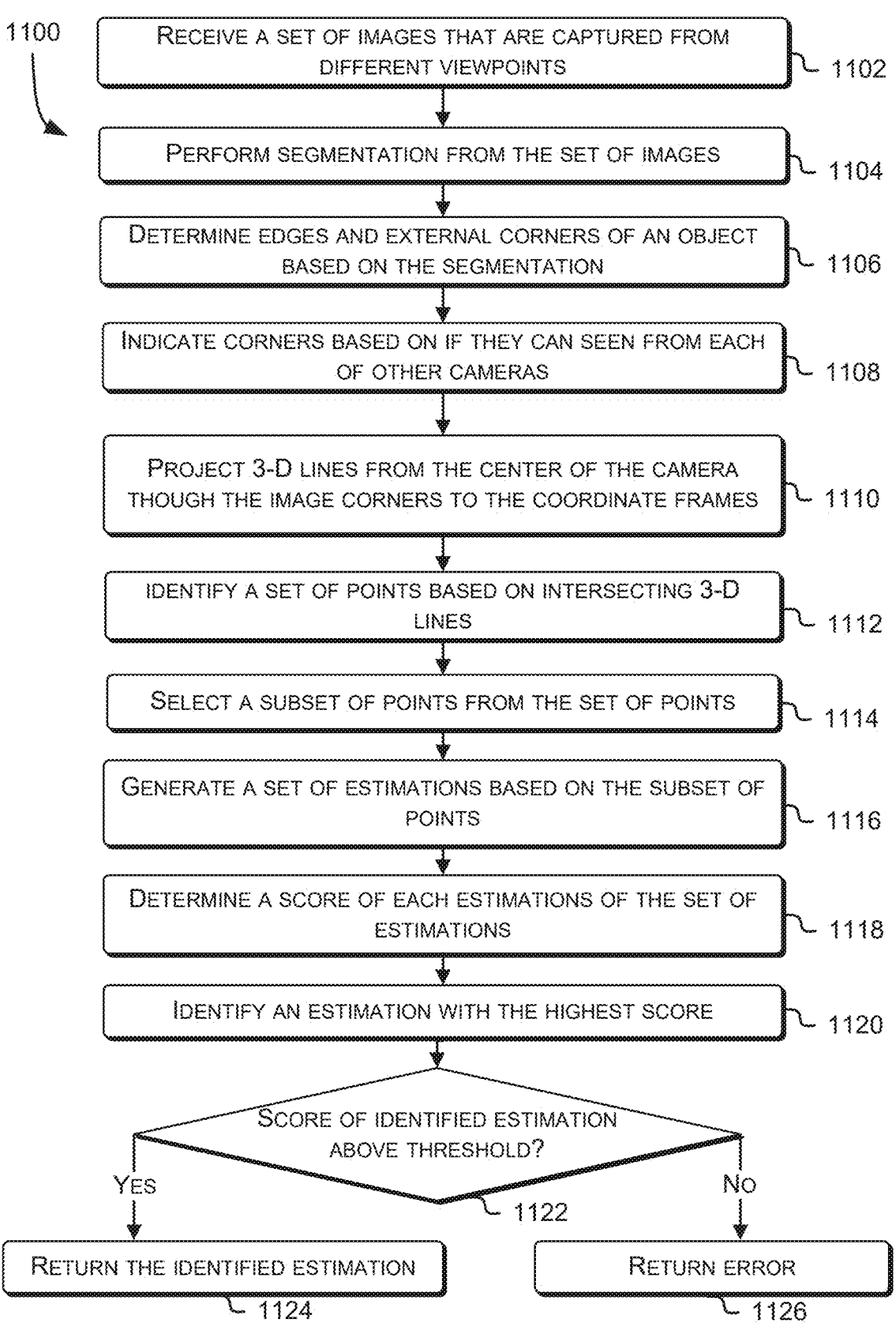

1100

RECEIVE A SET OF IMAGES THAT ARE CAPTURED FROM DIFFERENT VIEWPOINTS ⌐ 1102

PERFORM SEGMENTATION FROM THE SET OF IMAGES ⌐ 1104

DETERMINE EDGES AND EXTERNAL CORNERS OF AN OBJECT BASED ON THE SEGMENTATION ⌐ 1106

INDICATE CORNERS BASED ON IF THEY CAN SEEN FROM EACH OF OTHER CAMERAS ⌐ 1108

PROJECT 3-D LINES FROM THE CENTER OF THE CAMERA THOUGH THE IMAGE CORNERS TO THE COORDINATE FRAMES ⌐ 1110

IDENTIFY A SET OF POINTS BASED ON INTERSECTING 3-D LINES ⌐ 1112

SELECT A SUBSET OF POINTS FROM THE SET OF POINTS ⌐ 1114

GENERATE A SET OF ESTIMATIONS BASED ON THE SUBSET OF POINTS ⌐ 1116

DETERMINE A SCORE OF EACH ESTIMATIONS OF THE SET OF ESTIMATIONS ⌐ 1118

IDENTIFY AN ESTIMATION WITH THE HIGHEST SCORE ⌐ 1120

SCORE OF IDENTIFIED ESTIMATION ABOVE THRESHOLD? ⌐ 1122

YES                                    NO

RETURN THE IDENTIFIED ESTIMATION ⌐ 1124

RETURN ERROR ⌐ 1126

FIG. 11

SHAPE AND POSE ESTIMATION FOR OBJECT PLACEMENT

BACKGROUND

In logistics and warehousing, it is challenging for robots to estimate a pose and shape of objects (e.g., packages, items) for efficient storage and shipping operations. For example, using cameras and computer vision algorithms, robots may generate inaccurate estimates of poses and shapes of packages to be stored because of variations in lighting and surface reflections across different views of the packages that can cause discrepancies in the images used by the computer vision algorithms. As another example, robots can use neural networks that overestimate or underestimate a size or shape of an object due to poor training of the neural networks.

Without accurate estimates of each object's pose and shape, robots may not be able to pack objects in a container as tightly as possible without any damage, unused space, or unwanted alteration to the object. For example, robots might underutilize container space by improperly organizing objects (e.g., leaving significant empty space). This leads to increased operational demands, resulting in using more computer resources and more power consumption. Accordingly, there is a need for robots that can generate accurate estimates of shape and pose for objects.

BRIEF DESCRIPTION OF THE DRAWINGS

Various techniques will be described with reference to the drawings, in which:

FIG. 11 illustrates another example process to perform object estimation, in accordance with at least one embodiment;

DETAILED DESCRIPTION

Figure 1:
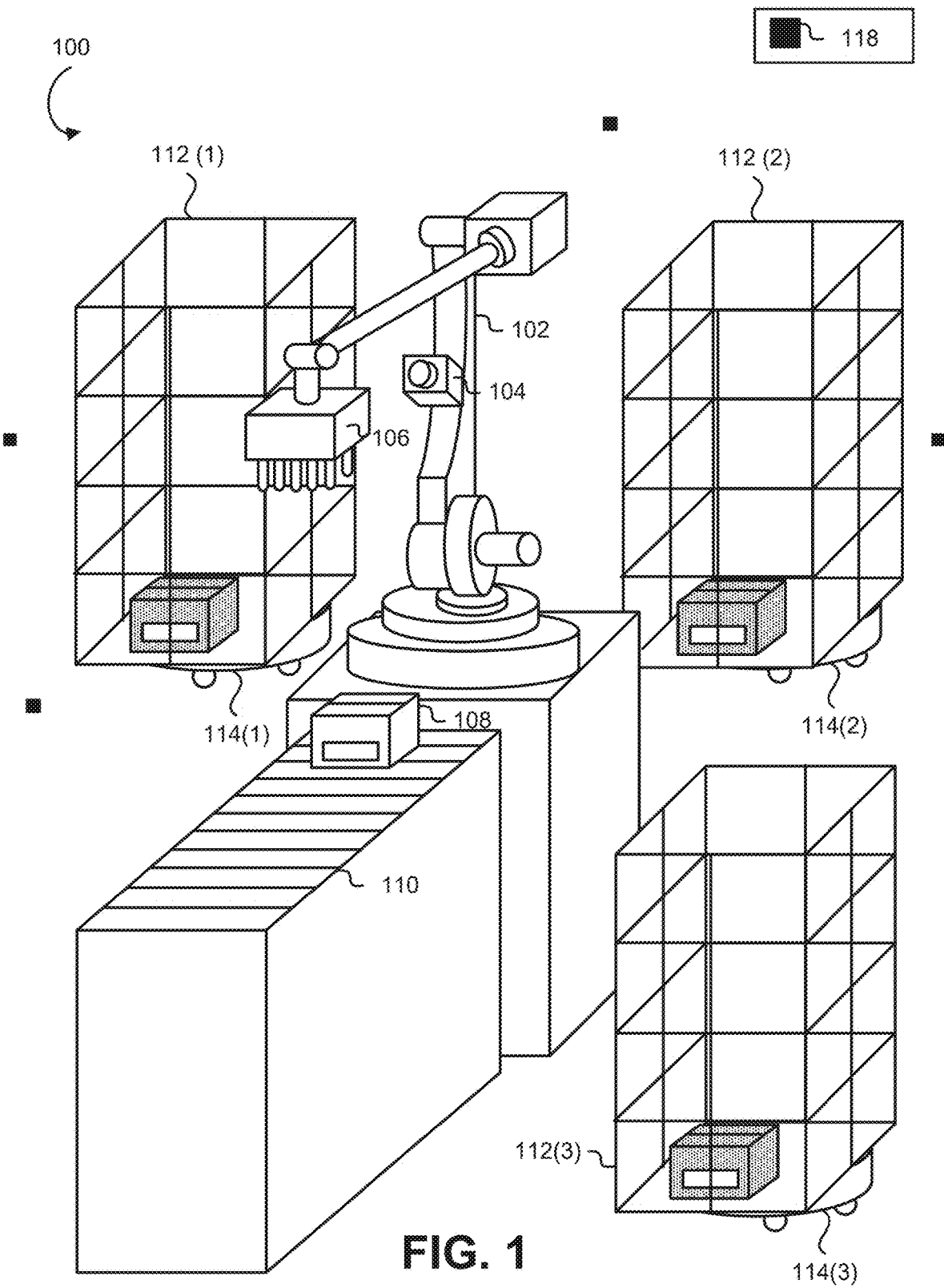
FIG. 1 illustrates an example environment including a robot placing objects in different containers by estimating pose and shape of the objects, in accordance with at least one embodiment.

One way to estimate the shape and pose of an object is using a processor to perform a carve out method. The carve out method includes creating a 3D model of an object by starting with a large block that encloses the object's space and then systematically removing parts of this block that are not part of the object. The software for the carve out method includes a removal process that is based on images taken from multiple angles around the object; areas that cannot be seen in any of the images are considered empty space (also referred to as "carved out"). By comparing the visibility of different sections of the block in these images, the method refines the block into a shape that closely approximates the object's actual shape. However, the carve out method can be inaccurate due to a bulging effect. A bulging effect includes where the middle part of an object, like a box, appears larger than it actually is in the 3D model. This happens because the method removes (or carves out) parts of the volume that are not visible in the images, but it can struggle to accurately assess parts of the object that are slightly obscured or at complex angles. As a result, the method might not carve out enough volume in the middle, leading to a bulging appearance. In some embodiments, this inaccuracy is problematic because it leads to an overestimation of the object's size and volume, affecting tasks that require precise dimensions, such as fitting an object into a specific space.

To address shortcomings of the carve out method (e.g., bulging) and to improve techniques for estimating properties of objects (e.g., pose, shape, geometry), systems and methods are described herein for accurate object property estimation (e.g., pose and shape) based on images depicting the objects from different viewpoints. For example, a system in a warehousing and logistics environment may include robot workcells, autonomous robots, and a group of computing devices (e.g., laptops, mobile phones, computers, computers in a data center, cameras). The robot workcells may include a robotic arm that can move objects that are detected, lift them, read any labels corresponding to the objects, and place them in different containers within the robot workcells based on how other objects are placed, positioned, or otherwise located in each container.

To determine how to place objects in different containers or within containers, the group of computing devices may obtain images of the object. These images can be captured in several ways including by multiple cameras located in various parts of the environment, providing different viewpoints (e.g., from the north, south, east, west sides), or by one or a few cameras that can move around the environment to capture images from different viewpoints. For example, a camera or cameras can be positioned anywhere in work cell such that the individual camera or group of cameras can capture a whole object to generate comprehensive images of the object from all perspectives, including, e.g., top, bottom, east, west, and every angle in between. A viewpoint can be a camera viewpoint that may refer to the specific position and orientation from which a camera captures an image or scene (e.g., it can determine the angle, perspective, and portion of the scene that is visible in the photograph or video, where the camera is looking from and how the camera is angled towards the subject or scene being captured). Additionally, the images may capture objects at different times to depict dynamic scenes (e.g., every few seconds, every few minutes, or after a period of time for a robot performing a task to move an object has expired).

After determining that the group of computing devices received the images with different viewpoints, the group of computing devices may perform image segmentation using neural networks to generate a polygon that represents the objects in 2-dimensional (2D) space. The polygon can be simplified for more accurate representation. For example, the group of computing devices may traverse on the polygon points and remove the points that have an angle of less than a certain threshold between incoming and outgoing edges. The group of computing devices may identify edges using either the original polygon or the simplified polygon. Then, the group of computing devices may determine that the intersections of the edges are the corners of the objects. The group of computing devices may indicate (e.g., annotate, highlight) the polygon, edges, and corners on the images.

As a result, each image that corresponds to a different viewpoint may include corners that are indicated. The indications can be different based on whether it can be identified from the left from the viewpoint or right from the viewpoint. For each image, the group of computing devices may generate lines in 3-dimensional (3D) space that project from the center of the viewpoints through corners of the objects. The group of computing devices may identify points based on intersecting lines in 3D space. But some of the points that are not within a region of interest (ROI) are removed. Additionally, the group of computing devices may only keep the points that are identified as a result of intersecting lines from corners that can be seen from different viewpoints. For example, the remaining points can be located in the left side of one viewpoint and in the right side of another viewpoint at the same time.

For each combination of four points, the group of computing devices may identify that three vectors generated from the four points are orthogonal to each other. Then, the group of computing devices may identify the other four points such that the eight points together becomes the candidate estimation (e.g., cuboid) of the objects. The group of computing devices may project the candidate estimations on the images and compare the projected estimations with the polygon to generate a score for each candidate. If the projected estimations are close to the polygon, the candidate estimation may receive a higher score. The group of computing devices may select the candidate with the highest score and output that as the final object estimation (e.g., oriented bounding box) of the object.

Based on the object estimation that indicates shape (e.g., length, width, height) in 3D and pose (e.g., position and orientation of the object) in 6D, the group of computing devices may determine which container to place the objects in. The group of computing devices may obtain geometry information of the container and other objects within the container and may use all the information to select which container and where within the selected container to place the objects.

After the selection, the group of computing devices may generate control signals that cause the robot workcells to move, place, or otherwise modify the object's location. Accurate shape and pose estimation of objects allows the robot workcells to pack or stack objects as much as possible without any damage or unwanted alteration to the objects. In response to determining that a container is fully packed with objects, the group of computing devices can cause autonomous robots to move the container to a different location.

The group of computing devices includes a robot controller that coordinates different robots that are within warehousing and logistics environments.

In the preceding and following description, various techniques are described. For purposes of explanation, specific configurations and details are set forth in order to provide a thorough understanding of possible ways of implementing the techniques. However, it will also be apparent that the techniques described below can be practiced in different configurations without the specific details. Furthermore, well-known features can be omitted or simplified to avoid obscuring the techniques being described.

As one skilled in the art will appreciate in light of this disclosure, certain embodiments can be capable of achieving certain technical improvements, including some or all of the following: (1) accurate object estimation of objects with varying shape which prevents the need to use additional resources (e.g., computer resources, images in different time frames and views) to obtain detailed understanding of each object's geometry, (2) rapid decision-making of automated robots; and (3) reduced operational demands of automated robots (e.g., robotic workcells, carts), including less frequent container movements that results in lower computer resource consumption (e.g., processing power, energy consumption, memory requirements) as a result of efficient packing of objects.

FIG. 1 illustrates an example environment 100 of placing objects in different containers by estimating pose and shape of the objects. Environment 100 may include a robotic system that controls one or more robots (e.g., robotic arm 102) to place objects (e.g., object 108) in a location (e.g., containers 112(1), 112(2), or 112(3)) using object estimation described herein.

In at least one embodiment, environment 100 may include a robotic arm 102 in a robotic workcell in an object handling facility (e.g., warehouse, distribution center, fulfillment center). Robotic arm 102 may pickup and place items, such as object 108, into one of the containers 112(1), 112(2), or 112(3). Robotic arm 102 can pick up, hold, grip, grasp, seize, or otherwise grab object 108 from a conveyor belt 110 and can perform shape and pose estimation of object 108. Using an estimate of shape and pose, robot arm 102 can place object 108 (e.g., package, purchased item, item to be shipped) into any of containers 112(1), 112(2), or 112(3) as part of a process to pack, stack, organize, or otherwise sort objects among containers 112(1), 112(2), or 112(3). Containers 112(1), 112(2), or 112(3) can be different sizes (e.g., 5, 10, 20, 30 square feet) and designed to store objects (e.g., packages) by including a metal, plastic, or other rigid material to form a cage to protect and support objects. For example, containers 112(1), 112(2), or 112(3) can be small containers (e.g., 1-2 square feet or less) designed to carry, hold, or otherwise store a single object or containers 112(1), 112(2), or 112(3) can be large (e.g., more than 2 square feet) and design to carry, hold, or otherwise store many objects. Various systems and techniques to perform the shape and pose estimation are further described in conjunction with FIGS. 3-12.

In at least one embodiment, shape of an object (e.g., object 108) may refer to its external form or contour, encompassing its geometry and spatial arrangement. This may include dimensions in three axes (length, width, height), surface texture, and any curves, edges, or vertices that define the object's volume and structure in three-dimensional space. Pose of an object (e.g., object 108) may refer to its orientation and position in space. Also, pose can be defined by the object's translation (movement along the X, Y, and Z axes) and rotation (around these axes), determining how the object is situated relative to a reference point or coordinate system.

Robotic arm 102 can be a mechanical arm capable of movements similar to those of a human arm. Robotic arm 102 may include a number of links or joints that allow rotational and translational displacement or movement. The links or joints may form a kinematic chain, and the kinematic chain may terminate with end effector 106 that interacts directly with object 108 it is manipulating. End effector 106 may include one or more of grippers, suction cups, vacuum grippers, magnetic grippers, clamps, forklift attachments, bag grippers, spindle adapters, etc. For example, end effector 106 can include flat suction cups for handling boxes or bags, bellows suction cups for more delicate or irregularly shaped objects, and different materials for different surfaces and weights. Those may allow robotic arm 102 to pick up object 108 and calculate a trajectory for placing object 108 into any of containers 112(1), 112(2), or 112(3). End effector 106 may hold or grip object 108 for transport. End effector 106 may pick up and place a variety of types, sizes, shapes, and weights of items and can be analogous to the human hand.

In at least one embodiment, autonomous robots 114(1), 114(2), or 114(3) may reposition, move, guide, or otherwise relocate containers 112(1), 112(2), or 112(3) within reach of robotic arm 102. Alternatively, autonomous robots 114(1), 114(2), or 114(3) may reposition containers 112(1), 112(2), or 112(3) such that containers 112(1), 112(2), or 112(3) can be placed into designated locations within robot workcells. Autonomous robots 114(1), 114(2), or 114(3) are mobile robots that can be used in the object handling facility. Autonomous robots 114(1), 114(2), or 114(3) can be equipped with a variety of sensors, cameras, and navigation systems that enable them to understand and interact with their surroundings, making decisions in real-time to perform tasks such as moving containers and products within a warehouse. Autonomous robots 114(1), 114(2), or 114(3) may use techniques including Light Detection and Ranging (LiDAR), computer vision, and simultaneous localization and mapping (SLAM) algorithms to navigate through environment 100. Autonomous robots 114(1), 114(2), or 114(3) may dynamically create and update a map of environment 100, identify obstacles, and plan optimal routes to their destinations within environment 100.

In at least one embodiment, object 108 may refer to an item that needs to be processed in environment 100 and needs to be delivered to a certain place (e.g., another warehouse, delivery address). Object 108 can be an item that needs packaging, which can be in different shapes. Alternatively, object 108 can be a package that contains smaller items that are enclosed or stored. Object 108 may include packages (e.g., box) with different types, sizes, and shapes (e.g., cuboid). The shapes may include, for example, bottles, jars, can, pouches, sachets, tubes, blister packs, wraps, films, bags, etc. As another sample, object 108 can be unpacked and a stand alone object such that robots 114(1), 114(2), or 114(3) can move the object directly (e.g., by placing suction cups or claws directly on the object).

Cameras 118 can be positioned in a robot workcell (that may include robotic arm 102) to provide a 360-degree view of robotic arm 102 and/or object 108. Additionally, robotic arm 102 may include camera 104. Cameras 118 can either include multiple cameras or a single camera. Cameras 118 are to capture object 108 in various perspectives to provide a more comprehensive view of object 108. Cameras 118 and camera 104 can move (e.g., rotate) to provide additional views of object 108. Cameras 118 and/or camera 104 may include cameras 320. Additionally, cameras 118 may include barcode and quick-response (QR) code scanning cameras (e.g., stationary scanners), 3D imaging cameras, wearable cameras for human workers, security cameras, etc. While multiple cameras 118 are shown in FIG. 1, a single camera can be used to generate images of object 108 from different viewpoints. For example, a rotating arm can include a camera, where the rotating arm moves the camera around an object while capturing images of the object (e.g., 360 degrees of rotation). As another example, a motorized rotation system (e.g., electric motor) can move a camera around an object, where the system includes a control unit to control the rotation speed, angle increments, and timing of image capture. To determine information about a camera and its viewpoint, QR codes may be placed throughout the environment (e.g., warehouse), which can be easily recognized by cameras to determine their location and orientation relative to markers. A computing device (e.g., data center, mobile phone, server) can use SLAM (Simultaneous Localization and Mapping), Integration of Inertial Measurement Units (IMUs), and/or Global Positioning System (GPS) to construct a map of the environment while simultaneously determining camera positions within it, and the cameras provide information about their settings (e.g., angles, width of lens) that can be used to refine the location and/or viewpoint information. Cameras may enhance accuracy by providing additional data on movement and orientation. Also, a computing device can use machine learning algorithms to further refine a computing device's ability to recognize and locate objects and cameras in dynamic warehouse environments, adapting to changes in layout and inventory.

Figure 3:
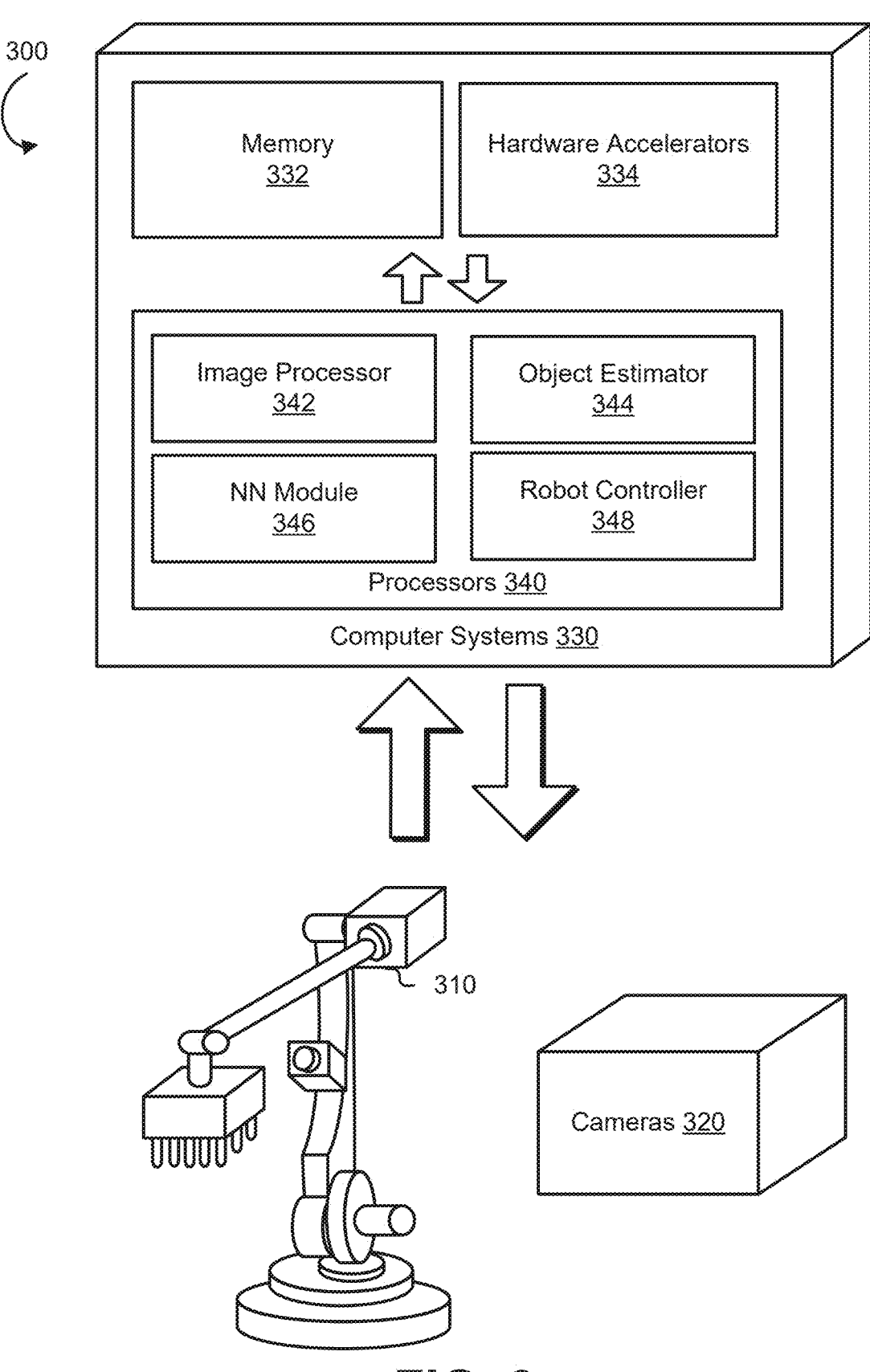
FIG. 3 illustrates an example block diagram including computer system, robot, and cameras for moving objects based on estimates of shape and pose of the objects, in accordance with at least one embodiment.

The images of object 108 with different viewpoints can be processed by one or more computing devices in an environment (e.g., environment 300 as shown in FIG. 3) for shape and pose estimation using various computer vision techniques, as described in further detail below, to develop a spatial, volumetric model of object 108. The model can be representative of a shape and pose of object 108. Among other information, the shape can include the length, width, and height dimensions (or related volumetric dimensions) of object 108 and the pose may include an orientation, position, and translation of object 108. The shape and pose can be embodied as a data model representative of the contours, shape, dimensions, orientation, and other parameters related to object 108. The one or more computing devices or environment may direct the operations of robotic arm 102 based on the estimated shape and pose of object 108.

Using the estimated shape and pose of object 108, the one or more computing devices or environment can execute algorithms directed to autonomous path planning. The computing device or environment can direct robotic arm 102 to place object 108 at a certain location within any of containers 112(1), 112(2), or 112(3), for example, to avoid voiding in any of containers 112(1), 112(2), or 112(3). In that sense, robotic arm 102 can be directed to place object 108 at a certain location and in a certain orientation such as, for example, rotation, angle, among a number of other items that are already positioned within any of containers 112(1), 112(2), or 112(3), to maximize the use of space in any of containers 112(1), 112(2), or 112(3). A processor controlling robotic arm 102 can direct robotic arm 102 to place object 108 in a location or in a manner such that it avoids damaging it, avoids crushing other items in the object 108, and accounts for other concerns (e.g., safety). Because the shape and pose estimate for object 108 may encompass volumetric information for object 108, the computing device or environment can account for the shape and size of object 108 when determining where and how to place it into any of containers 112(1), 112(2), or 112(3), among other objects.

Shape and pose estimation process described further herein can be implemented as part of autonomous path planning while object 108 is moving along a certain path or trajectory by the robotic arm 102. Thus, selection for pick up and place operations can continue without delay due to the shape and pose recovery process, and the specifics of the place operation can be calculated while object 108 is moving.

Figure 2:
FIG. 2 illustrates an example environment including cameras for capturing images of an object to estimate pose and shape of the object, in accordance with at least one embodiment.

FIG. 2 illustrates an example environment 200 of capturing images of an object to estimate shape and pose of the object. Environment 200 may include a robotic system that includes one or more cameras (e.g., cameras 206(1), 206(2), 206(3), or 206(4)) that generate images of an object (e.g., object 204) in different viewpoints. Environment 200 may include environment 100 illustrated in FIG. 1. Cameras 206(1), 206(2), 206(3), or 206(4) may include camera 104 and/or cameras 118 illustrated in FIG. 1. Cameras 206(1), 206(2), 206(3), or 206(4) may include cameras 320 illustrated in FIG. 3.

In at least one embodiment, cameras 206(1), 206(2), 206(3), or 206(4) can be located in different parts of a warehouse. In one example, cameras 206(1), 206(2), 206(3), or 206(4) may surround a robot workcell within a warehouse or distribution center to capture object 204 in different viewpoints. The multi-viewpoint images may provide a comprehensive visual record of object 204. The robot workcell may include conveyor belt or a designated imaging station to photograph object 204 as it moves through an area where it is inspected or selected to be picked up (e.g., by a robot).

Cameras 206(1), 206(2), 206(3), or 206(4) can be positioned at strategic intervals and heights around where object 204 is located to ensure full coverage. In one example, cameras 206(1), 206(2), 206(3), or 206(4) can be arranged in a circular or semi-circular pattern to encompass all possible angles, capturing the top, sides, and even the bottom of the package. Additionally, environment 200 may include other cameras (not illustrated in FIG. 2) that are located at the bottom of object 204, top of object 204, or any other location within a certain radius to provide a more detailed, specific, or other view of object 204. Alternatively, cameras 206(1), 206(2), 206(3), or 206(4) can move to those locations instead (e.g., using a rotation system). Cameras 206(1), 206(2), 206(3), or 206(4) may include LED panels or softbox lights to ensure consistent illumination across the entire imaging area, enabling the cameras to capture clear and detailed images of object 204. In at least one embodiment, cameras (not illustrated in FIG. 2) can be mounted to drones and the drones (e.g., an unmanned aerial vehicle that is controlled from a distance by a computer and/or operator) can move around object 204 to capture different views.

Cameras 206(1), 206(2), 206(3), or 206(4) can be synchronized to capture images simultaneously or in rapid succession as object 204 moves due to conveyor belt movement or robots picking up object 204. This can generate a coherent set of images or videos that accurately represent the package from every angle at a single point in time.

Cameras 206(1), 206(2), 206(3), or 206(4) can be integrated with different systems to exchange what they captured. In one example, cameras 206(1), 206(2), 206(3), or 206(4) can be part of a system of a warehouse such that information gathered from the imaging process, such as package condition, dimensions, and label information, is directly linked to the package's tracking information within the system. In another example, cameras 206(1), 206(2), 206(3), or 206(4) can be controlled by image processor 342 illustrated in FIG. 3 such that processed images can be used by object estimator 344 illustrated in FIG. 3 to perform object estimation of object 204.

FIG. 3 illustrates an example block diagram of environment 300 including computer system, robot, and cameras for moving objects based on estimates of shape and pose of the objects, in accordance with at least one embodiment. Environment 300 may include robot 310, cameras 320, and computer system 330. Computer system 330 may refer to one or more computing devices that capture images of objects that robot 310 is going to place (to a container) based on object estimation of the objects. Computer systems 330 may refer to one or more computing devices. Computer systems 330 may include processors 340, memory 332, and hardware accelerators 334. Processors 340 may refer to one or more central processing units (CPU).

Processors 340 may include image processor 342, object estimator 344, neural network (NN) module 346, and robot controller 348. Processors 340 may run software to provide functionality described herein. Terms such as "software" described herein may include one or more of operating systems, device drivers, application software, database software, graphics software (e.g., Radeon, Intel Graphics), web browsers, development software (e.g., integrated development environments, code editors, compilers, interpreters), network software (e.g., Intel PROset, Intel Advanced Network Services), simulation software, real-time operating systems (RTOS), artificial intelligence software (e.g., Scikit-learn, TensorFlow, PyTorch, Accord.NET, Apache Machout), robotics software (Robotics Benchmarks for Learning (ROBEL), MS AirSi, Apollo Baidu, ROSbot 2.0, Poppy Project), firmware (e.g., BIOS/UEFI, router, smartphone, consumer electronics, embedded systems, printer, solid state drive (SSD)), application programming interface (API), containerized software (e.g., Nginx, Apache HTTP Server, MySQL, PostgreSQL, Redis, Memcached, Node.js, Elasticsearch, Gitlab, Jenkins, WordPress), container orchestration platform (e.g., Kubernetes, Docker Swarm, Apache Mesos, Nomad, Microsoft Azure Kubernetes Service, Google Kubernetes Engine, Red Hat OpenShift, Rancher) and any other implementation embodied as a software package, code and/or instruction set.

Terms such as "hardware" described herein may include, in addition to processors 340 and hardware accelerators 334, one or more of hardwired circuitry, programmable circuitry, state machine circuitry, fixed function circuitry, execution unit circuitry, and/or firmware that stores instructions executed by programmable circuitry.

In at least one embodiment, image processor 342 may refer to a module that generates and preprocesses (e.g., denoises, downsamples, upsamples, or otherwise modifies) images before they are used by object estimator 344 or NN module 346. Image processor 342 may use cameras 320 to capture objects that are within, for example, a robot workcell in an environment 100, environment 200, and/or environment 1200 illustrated in FIGS. 1, 2, and 12.

Cameras 320 can be located in different places near the robot workcell to capture objects from different perspectives. Cameras 320 may include one or more (e.g., 1-10) cameras. Alternatively, some or all of cameras 320 may move around the robot workcell to capture objects from different perspectives. Cameras 320 may include hardware devices such as digital cameras (e.g., Digital Single-Lens Reflex, mirrorless cameras), smartphones, tablets, webcams, action cameras, Closed-Circuit Television cameras, drones, ultrasound machines, and/or machine vision cameras.

In addition, image processor 342 may modify images captured by cameras 320. Modification of images may include, for example, resizing, cropping, normalization (e.g., scaling intensity values), augmentation (e.g., rotation, flipping, zooming, shifting, other affine transforms), redistribution of intensity values (e.g., histogram equalization), denoising, enhancement (e.g., adjusting brightness, contrast, sharpness), color space conversion, filtering (e.g., Laplacian, Sobel, Gaussian blur), image alignment, scaling (e.g., deep learning super-sampling (DLSS), Xe super-sampling (XeSS), AMD FidelityFX Super Resolution (FSR)), and/or anti-aliasing (e.g., multi-sample anti-aliasing (MSAA), fast approximate anti-aliasing (FXAA), temporal anti-aliasing (TAA), super-sampling anti-aliasing (SSAA), conservative morphological anti-aliasing (CMAA)).

Image processor 342 may generate or modify neural network training data that can be used by NN module 346. For example, image processor 342 may generate labels for supervised learning or generate partially labeled data for semi-supervised learning of neural networks. Image processor 342 may receive indications of ground truth to generate those labels.

In at least one embodiment, object estimator 344 may refer to a module that performs object estimation of one or more objects. Object estimator 344 may receive from image processor 342, two or more images that capture the one or more objects from multiple perspectives. Object estimator 344 may wait until the object estimator 344 determines that the two or more images include at least two perspectives of the image. Object estimator 344 may use one or more neural networks that are trained using NN module 346 described herein to perform image segmentation on the two or more images. The one or more neural networks may include, for example, fully convolutional networks (FCNs), U-Net, Seg-Net, DeepLab, Mask R-CNN, Pyramid Scene Parsing Network, RefineNet, etc.

As a result of performing the image segmentation, for each image of the two or more images, a polygon that corresponds to the object can be generated. A polygon may refer to a closed shape defined by a series of straight-line segments that approximate or delineate a region within an image. The polygon may represent a segmented area, often used to identify and isolate specific features, objects, or boundaries within the image, based on criteria like color, intensity, texture, or other image properties. Object estimator 344 may generate a polygon by tracing the outline of a segmented object, connecting the edge points detected during segmentation. This may result in a polygonal approximation of the object's shape. Object estimator 344 may simplify the generated polygon by removing some points of the polygon if they include an angle less than a certain threshold.

Object estimator 344 may identify edges of the objects using the simplified polygon. Then, object estimator 344 may identify corners of the objects based on intersecting edges. Object estimator 344 may mark the identified corners based on if they can be seen from each of the perspectives. Alternatively, object estimator 344 can use one or more neural networks (from NN module 346) that are trained to identify edges and corners.

Object estimator 344 may generate lines in 3D space that project from the center of camera that captures the image in a different perspective through the corners in the image. Object estimator 344 may identify intersection points of at least two lines. After identifying all intersection points, object estimator 344 may remove some intersection points that are outside region of interest (ROI). A region of interest can be an example size of an object (e.g., standard size of package to be shipped, size of a package that is 5-10% larger than a standard package size). A ROI can be provided to a computer performing object estimator 344 based on experimental data from previous object estimations. One example of ROI can be $1.5 \times 1.5 \times 2$ m$^3$. Another example of ROI can be $1 \times 1 \times 1$ m$^3$. Object estimator 344 may further remove intersection points that aren't generated as a result of intersecting lines from corners that can be seen from different perspectives. For example, intersection points that may remain are from a corner in perspective #1 that can also be seen from perspective #2 or a corner in perspective #2 that can also be seen from perspective #1.

Object estimator 344, performed by processors 340, may select four intersection points and determine whether they construct at least three orthogonal vectors. If four intersection points construct three orthogonal vectors, object estimator 344 may compute four other intersection points and record all eight intersection points that form a candidate estimation (e.g., cuboid). After identifying several candidate estimations, object estimator 344 may determine a score of each candidate estimation by projecting the candidate estimations on each image to compare the projected estimations with the simplified polygon indicated (e.g., highlighted, annotated, or otherwise marked) on each image of the two or more images. Alternatively, object estimator 344 may determine the length of the vector and compare with ground truth (e.g., expected box dimensions) to identify the estimation without the scoring process described further herein. For example, an object estimator 344 may receive a QR code it reads from an image of a box, which it can use to determine the expected size of a box and use this to adjust its scoring. As another example, an object estimator 344 can receive standard identification number for an object (e.g., Amazon Standard Identification Number (ASIN), International Standard Book Number (ISBN), Stock Keeping Unit (SKU)) using image recognition software, and then use the standard dimensions of an object from the standard identification number as a ground truth or expected values for object dimensions and use this information to adjust its scoring. Object estimator 344 may select a candidate estimation with the highest score. Object estimator 344 may generate an oriented bounding box (OBB) and may send the OBB to robot controller 348 for further operations.

In at least one embodiment, an example schema for object estimator 344 can be:

```
name: "QueueBatchForGeometricShapeEstimation"
docs: Queue a batch of images and corresponding detected item-segment, and extrinsics
arguments:
    image_to_segmentations_associations:
        doc: Association mappings between images and corresponding item segments.
        type: VALUE
        contentType: "protobuf/carbon.service.types.Associations"
        required: true
```

-continued

```
    image_to_sensor_poses_associations:
       docs: Associations mapping between the sensor_pose relative to the tool_tip fr
       type: VALUE
       contentType: "protobuf/carbon.service.types.Associations"
       required: true
       image_to_intrinsic_calibration_associations:
       docs: Associations mapping between images namespaces and corresponding
camera
       type: VALUE
       contentType: "protobuf/carbon.service.types.Associations"
       required: true
    expected_box_dimensions:
       docs: Expected dimensions of the detected box from TCDA data to help improve t
       type: VALUE
       contentType: "protobuf/carbon.geometry.types.Cuboid"
       required: false
results:
    oriented_bounding_box:
       docs: 3D oriented bounding box of the tote with pose in the world frame.
       type: VALUE
       contentType: "protobuf/carbon.geometry.types.Composite3DShape"
       required:false
    confidence:
       docs: the score indicating the accuracy confidence for the estimated shape [0,1]
       type: VALUE
       contentType: "protobuf/google.protobuf.DoubleValue"
       required: true
- name: "CancelGeometricShapeJob"
docs: Cancel the ongoing box shape estimation and reset the states in the module.
```

As shown in the example schema, the inputs include a first value map from images to their associated segmentations (e.g., image_to_segmentations_associatations), a second value map from images to their associated sensor pose (e.g., image_to_sensor_pose_associatations), and a third value map from images to their associated intrinsic parameters (e.g., image_to_instrinsic_calibration_associations). Object estimator 344 may receive at least four captures from different viewpoints to perform pose and shape estimations. Additionally, the outputs shown in the example schema include, for example, container_bounding_box that includes length, width, and height of an object, a quaternion for object rotation in EoAT frame, and a 3-vector for box translation in EoAT frame.

In at least one embodiment, object estimator 344 may perform estimations in parallel with other algorithms (e.g., space carving algorithm) to estimate pose and shape of an object. The outputs generated by performing other algorithms may serve as backup or in conjunction with the outputs of object estimator 344 to identity shape and pose of the object. For example, estimation generated by object estimator 344 is used as default. But, if an estimation generated by object estimator 344 is below a threshold, object estimator 344 may indicate to the computer systems 330 that the outputs generated by performing other algorithms may serve as a more accurate estimate of pose and shape of an object.

In at least one embodiment, NN module 346 may refer to a module that performs neural network training and inferencing. Terms such as "neural networks" described herein may include one or more of feedforward neural network, convolutional neural network (CNN), recurrent neural network (RNN), long short-term memory (LSTM) network, generative adversarial network (GAN), restricted boltzmann machine (RBM), deep belief networks (DBN), radial basis function network (RBFN), hopfield network, self-organizing maps, perceptrons with one or more layers, modular neural networks, spiking neural networks, deep reinforcement learning networks, echo state networks, time-delay neural networks, support vector machines, attention-based neural networks, autoencoders, graph neural networks (e.g., graph convolutional networks), variational autoencoders and/or transformer neural networks (e.g., Bidirectional Encoder Representations from Transformers).

NN module 346 may perform different neural network training techniques such as, for example, supervised learning, unsupervised learning, semi-supervised learning, reinforcement learning, transfer learning (e.g., fine-tuning), federated learning, etc. NN module 346 may include tools such as TensorFlow, PyTorch, ONNX, TensorRT, Intel Neural Compressor, Apache TVM, etc., to compress neural networks using hardware accelerators 334. NN module 346 may receive ground truth information and generates labeled training data on its own or in conjunction with image processor 342 to generate annotations on training data. NN module 346 may receive labeled training data outside of environment 300.

After performing the neural network training techniques, NN module 346 may deploy trained neural networks to, for example, object estimator 344 to perform neural network inferencing using images, where the inferencing includes image classification, object detection, image segmentation (e.g., semantic segmentation, instance segmentation), image super-resolution, image synthesis and generation, style transfer, etc. Alternatively, NN module 346 may receive the two or more images to perform image segmentation or identify edges and corners of a polygon on behalf of object estimator 344.

In at least one embodiment, robot controller 348 may refer to a module that generates control signals or other information that causes robots (e.g., robot arm 102 and autonomous robots 114(1) . . . (3) illustrated in FIG. 1, robot 202 illustrated in FIG. 2, robot 310, robot 1212, first autonomous robot 1226, second autonomous robot 1216 illustrated in FIG. 12) to move as intended. For example, robot controller 348 may receive object estimation of objects to be placed from object estimator 344 and may determine which location to place the objects using the robots. Additionally, robot controller 348 may receive additional information (e.g., geometry information of containers and other objects that are inside the containers) to make the determination.

Based on the determination, robot controller 348 may generate control signals to cause robot 310 to pick up one or more objects and place the one or more objects into one or more containers. When any of the one or more containers are full of objects, robot controller 348 may generate control signals to cause autonomous robots (e.g., carts) to move containers to a different location inside or outside of a warehouse. Robot controller 348 can use either wireless or wired communication to communicate (e.g., transmit signals) to robot 310 and/or the autonomous robots that move containers. Wireless communication may include radio frequency (RF) communication, Wi-Fi, Bluetooth, infrared communication, near field communication, cellular communication, satellite communication, long range (LoRA), etc.

Robot controller 348 may dynamically assign tasks based on the robots' proximity, capabilities, and current workload. The robot controller 348 may perform a scheduling algorithm that optimizes task sequences to minimize completion time and maximize overall efficiency. Robot controller 348 may anticipate changes in operational demands and adjusts task allocations accordingly.

To assign tasks, robot controller 348 decomposes complex tasks into manageable sub-tasks. Then, robot controller 348 may plan the sequence of actions required to accomplish each sub-task, considering factors such as efficiency, safety, and the capabilities of each robot. For each sub-task, robot controller 348 may determine the optimal path and movements required. Path planning may include calculating the most efficient routes for the robots to take, avoiding obstacles, and ensuring that robots do not collide with each other. Motion control may include the precise control of each robot's motors and actuators to follow the planned path and execute the required movement. Additionally, robot controller 348 may generate control signals by translating the planned actions and movements. These signals may include typically electrical or digital commands that directly interface with the robots' drive systems (motors, actuators) and other functional components (grippers, sensors). Robot controller 348 may send control signals to the robots through wired or wireless communication protocols. The choice of communication medium depends on factors such as the operational environment, the required response time, and the distance between the controller and the robots.

Robot controller 348 may include a monitoring interface that provides real-time feedback on the status and position of each robotic device. This allows operators of a warehouse to manually override the system to redirect robots or adjust task priorities in response to emergent situations, ensuring flexibility and responsiveness in dynamic environments. Robot controller 348 may include various sensors to implement safety protocols to prevent collisions and ensure the safety of both robots and human personnel. In particular, robot controller 348 may continuously scan the operational environment to identify potential hazards and autonomously adjusts the robots' paths to avoid them.

Robot controller 348 may use NN module 346 to use one or more neural networks to utilize historical performance data to identify patterns and inefficiencies. The one or more neural networks can be reinforced using such data and refines its task allocation, scheduling, and safety protocols to enhance performance and reduce operational costs.

In at least one embodiment, memory 332 may refer to one or more devices to store data. Memory 332 may include one or more random access memory (RAM), read-only memory (ROM), flash memory (e.g., USB flash drives, SSD, memory cards), cache memory, hard disk drives (HDDs), virtual memory, graphics memory, optical discs, network attached storage (NAS), cloud storage, tape storage, etc.

Memory 332 may store images captured from cameras 320, where the stored images might be subject to modification by image processor 342. Memory 332 may also store modified images generated by image processor 342. Memory 332 may also store configurations and thresholds used by object estimator 344 to perform object estimation. For example, configurations and thresholds that can be stored in memory 332 include $a_{thr}{}^e$, $I_{thr}{}^e$, $tol_c$, $thr_{crnr}$, $I_{thr}{}^I$, $a_{thr}{}^I$, $a_{thr}{}^o$, $n_{thr}{}^c$, $s_{thr}{}^P$, $S_{thr}{}^b$ that are described herein.

In addition, memory 332 may store neural network training data (either labeled or unlabeled) and hyperparameters usable by NN module 346 to train neural networks described herein. Hyperparameters may include learning rate, number of epochs, batch size, activation functions (e.g., rectified linear unit, sigmoid, tanh), network architecture, optimizer (e.g., stochastic gradient descent, Adam, RMSprop, and Adagrad), regularization techniques (e.g., L1, L2, dropout, early stopping), initialization methods (e.g., Xavier, He, random), weight decay, etc. Also, memory 332 can store various data and information generated by image processor 342, object estimator 344, NN module 346, and robot controller 348.

In at least one embodiment, hardware accelerators 334 may refer to one or more of specialized hardware units designed to perform specific tasks more efficiently than a general-purpose processor. Hardware accelerators include one or more of integrated circuit (IC), system on-chip (SoC), graphics processing unit (GPU), data processing unit (DPU), digital signal processor (DSP), tensor processing unit (TPU), accelerated processing unit (APU), application-specific integrated circuits (ASIC), intelligent processing unit (IPU), neural processing unit (NPU), smart network interface controller (SmartNIC), vision processing unit (VPU), field-programmable gate array (FPGA), etc.

The specific tasks performed by hardware accelerators 334 may include neural network inferencing and training performed by object estimator 344 and object estimator 1202. For example, neural network inferencing may include image classification, object detection, image segmentation (e.g., semantic segmentation, instance segmentation), image super-resolution, image synthesis and generation, style transfer, etc. Additionally, hardware accelerators 334 may accelerate the performance of one or more blocks of process 900, process 1000, and/or process 1100 illustrated in FIGS. 9-11. Hardware accelerators 334 may accelerate different robot control operations performed by robot controller 348. Also, hardware accelerators 334 may accelerate image generation and modification process performed by image processor 342.

Figure 13:
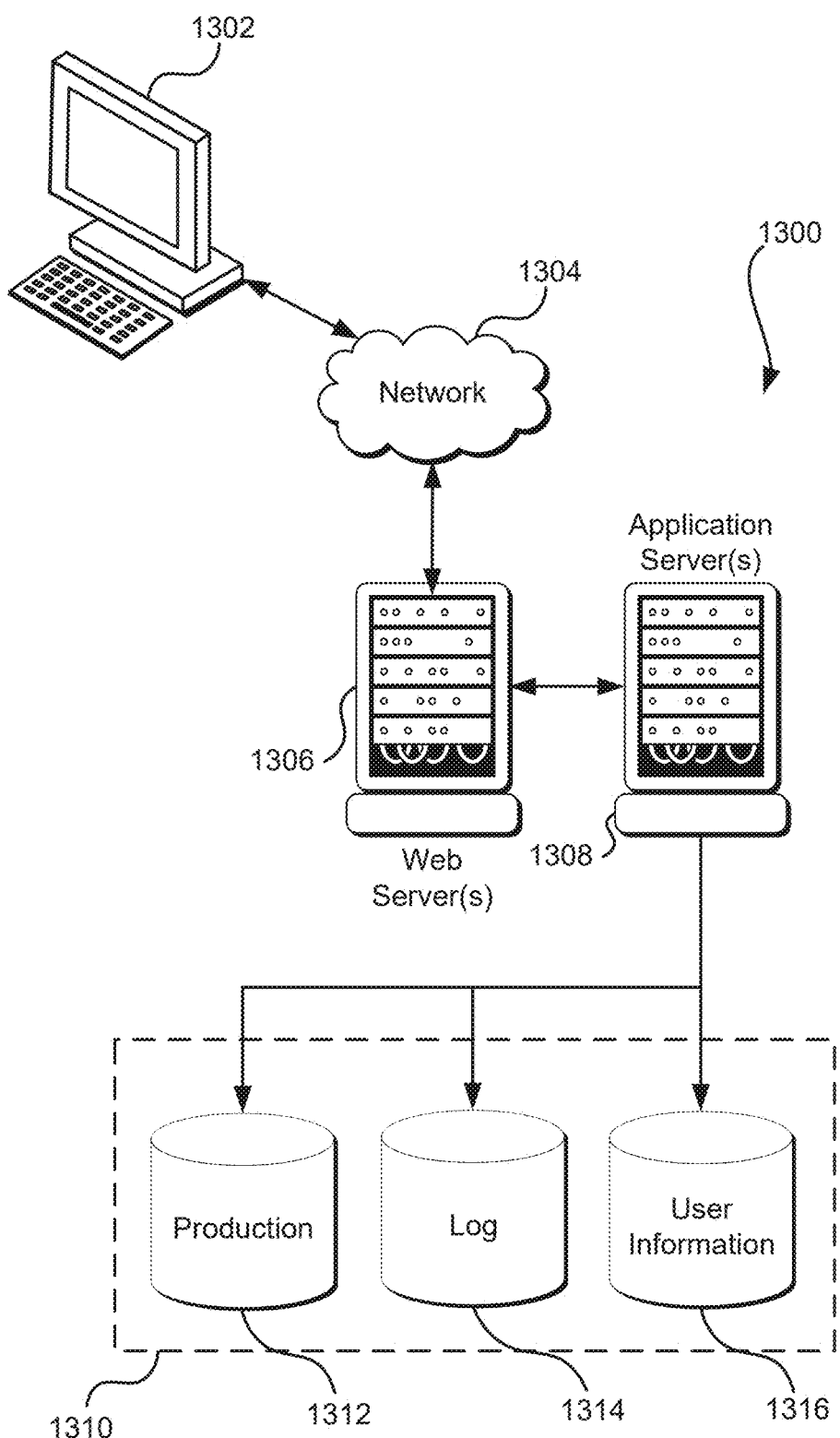
FIG. 13 illustrates a system in which various embodiments can be implemented.

In at least one embodiment, environment 300 may include system 1300 illustrated in FIG. 13. In one example, computer systems 330 may communicate with electronic device 1302 via network 1304 illustrated in FIG. 13 to receive user input, where the user input may include different thresholds described herein for shape and pose estimation and indication of ROI described herein. In another example, computer system 330 may communicate with electronic device 1302 via network 1304 illustrated in FIG. 13 to receive different hyperparameters described herein for neural network training. In another example, computer systems 330 may include application server 1308 to cause one or more modules (e.g., image processor 342, object estimator 344, NN module 346, robot controller 384) to be performed in conjunction with one or more blocks of process 900, process 1000, and/or process 1100 described in FIGS. 9-11.

Figure 4:
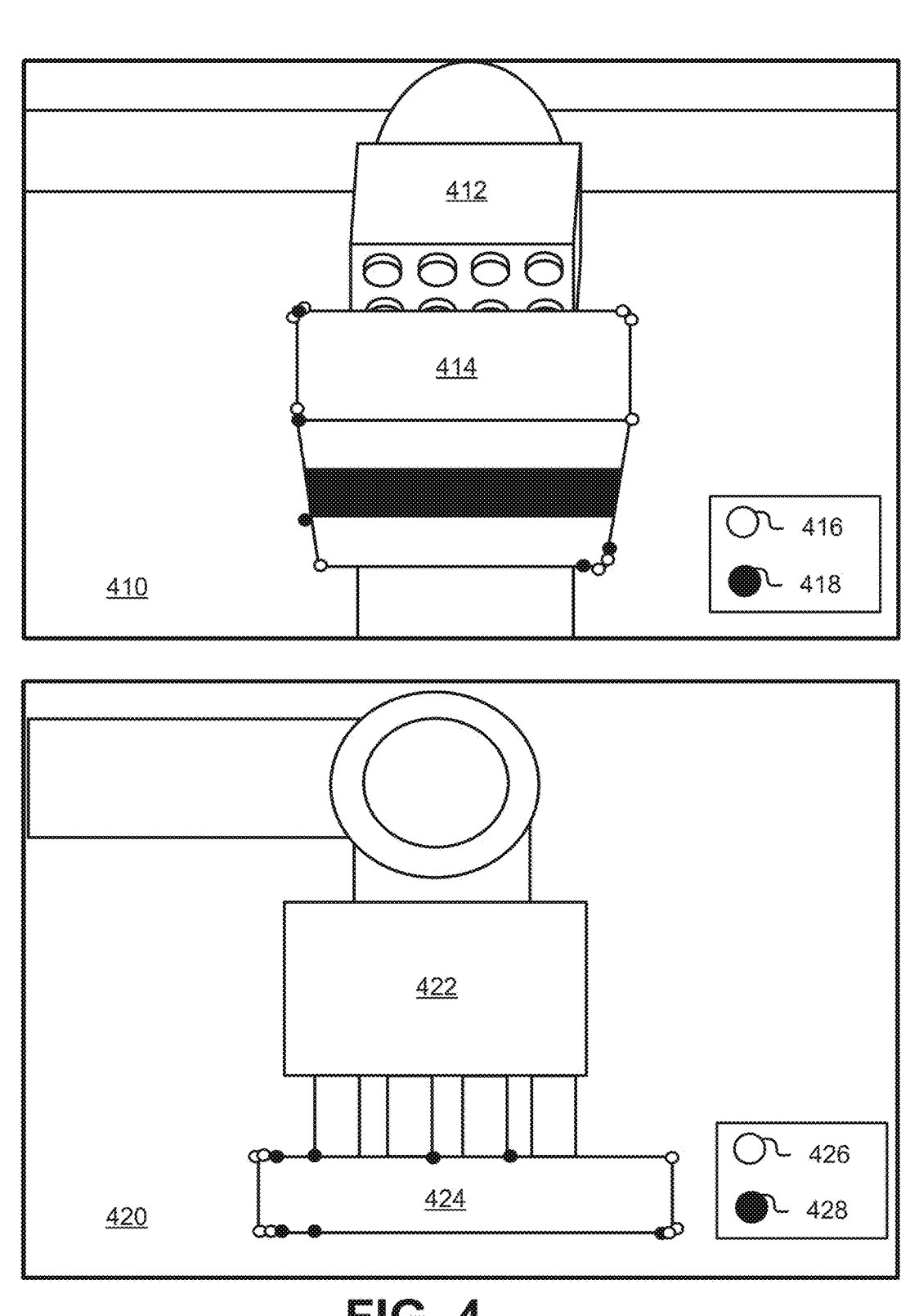
FIG. 4 illustrates an example of image segmentation, in accordance with at least one embodiment.

FIG. 4 illustrates an example 400 of image segmentation using images with different viewpoints. Example 400 may include first image 410 that was captured from a camera that is located in the bottom front of an object (e.g., object 414). Also, example 400 may include second image 420 that is located in the left side of the object (e.g., object 424). Object 414 and object 424 are identical but depicted in different perspective. First image 410 may depict end effector 412 of a robotic arm that picks up object 414. Second image 420 may depict end effector 422 of a robotic arm that picks up object 424. End effector 412 can be the same as end effector 422.

One or more neural networks that can be trained by NN module 346 illustrated in FIG. 3 may perform image segmentation to generate a polygon in first image 410 and second image 420. The polygon can be a convex polygon. First dots 416 and second dots 418 can be points of a polygon in the first image 410. Third dots 426 and fourth dots 428 can be points of a polygon in second image 420. Systems such as object estimator 344 and object estimator 1202 may indicate (e.g., highlight, annotate, or otherwise mark) first dots 416, second dots 418 in first image 410 and indicate third dots 426 and fourth dots 428 in second image 420.

The systems may generate a simplified polygon of first image 410 and second image 420 by traversing the dots of the polygon (e.g., first dots 416, second dots 418, third dots 426, fourth dots 428) and remove the points (e.g., second dots 418, fourth dots 428) that have an angle of less than a certain threshold (e.g., $a_{thr}^e=10$) between incoming and outgoing edges. As a result, only some of the points (e.g., first dots 416, third dots 426) may represent a simplified polygon.

Figure 5:
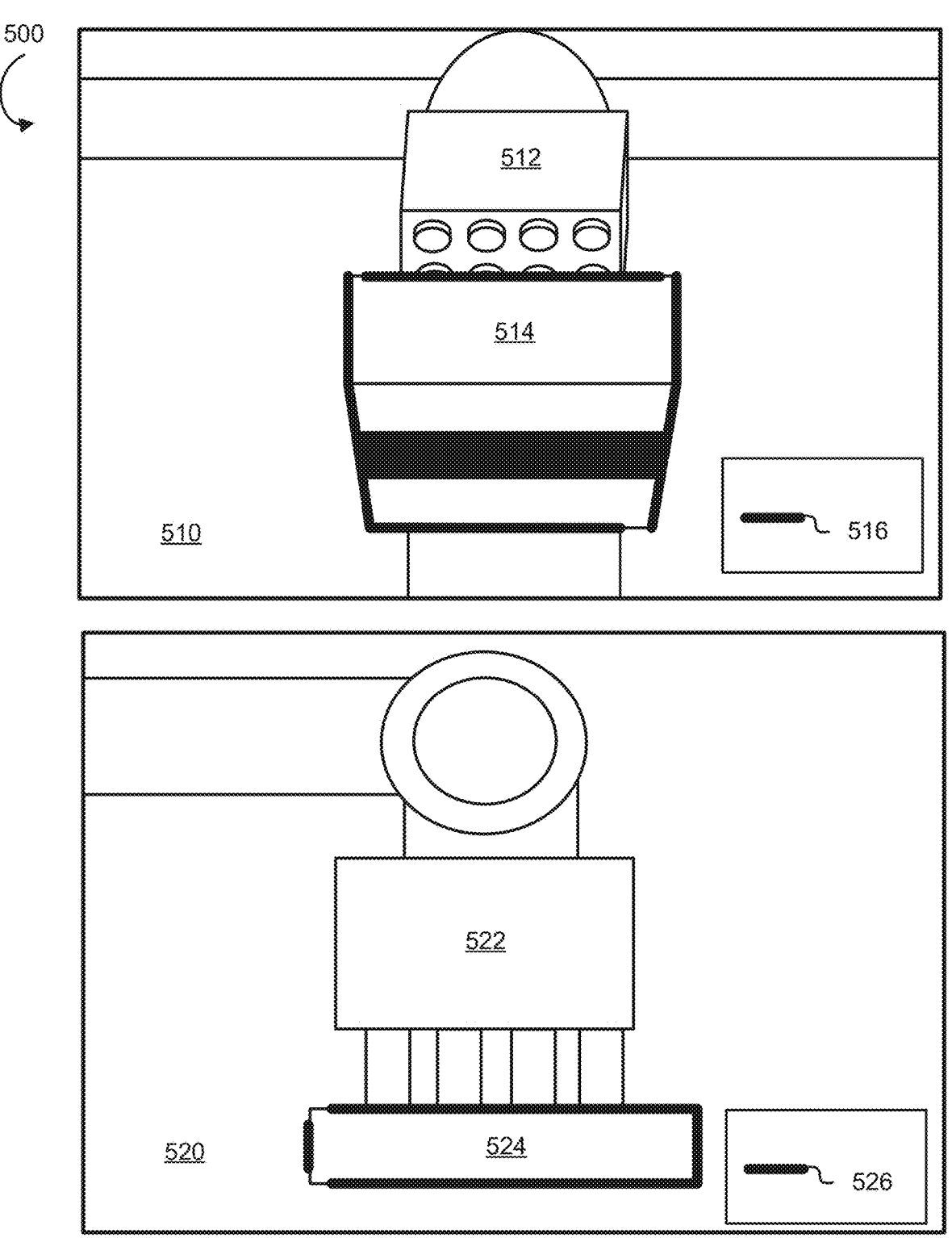
FIG. 5 illustrates an example of edge determination using images with different viewpoints, in accordance with at least one embodiment.

FIG. 5 illustrates an example 500 of edge determination using images with different viewpoints. Example 500 may include a first image 510 that was captured from a camera that is located in the bottom front of an object (e.g., object 514). Also, example 500 may include a second image 520 that is located in the left side of the object (e.g., object 524). Object 514 and 524 can be the same object. First image 510 can be first image 410 illustrated in FIG. 4 and second image 520 can be second image 420 illustrated in FIG. 4. Object 514 can be object 414 illustrated in FIG. 4 and object 524 can be object 424 illustrated in FIG. 4. First image 510 may depict end effector 512 of a robotic arm that picks up object 514. Second image 520 may depict end effector 522 of a robotic arm that picks up object 524. End effector 512 can be the same as end effector 522.

After generating the simplified polygon using the subset of dots (e.g., first dots 416 and third dots 426 illustrated in FIG. 4) in both first image 510 and second image 520, systems such as object estimator 344 and object estimator 1202 may compute, for example, six longest edges (e.g., first edges 516, second edges 526) by neighboring point pairs in the simplified polygon with farthest distances. The systems may ignore edges that are shorter than a threshold (e.g., $I_{thr}^e=30$ pixels). The systems may indicate first edges 516 in first image 510 and indicate second edges 526 in second image 520. Alternatively, the systems may use one or more neural networks to identify and indicate first edges 516 and second edges 526.

Figure 6:
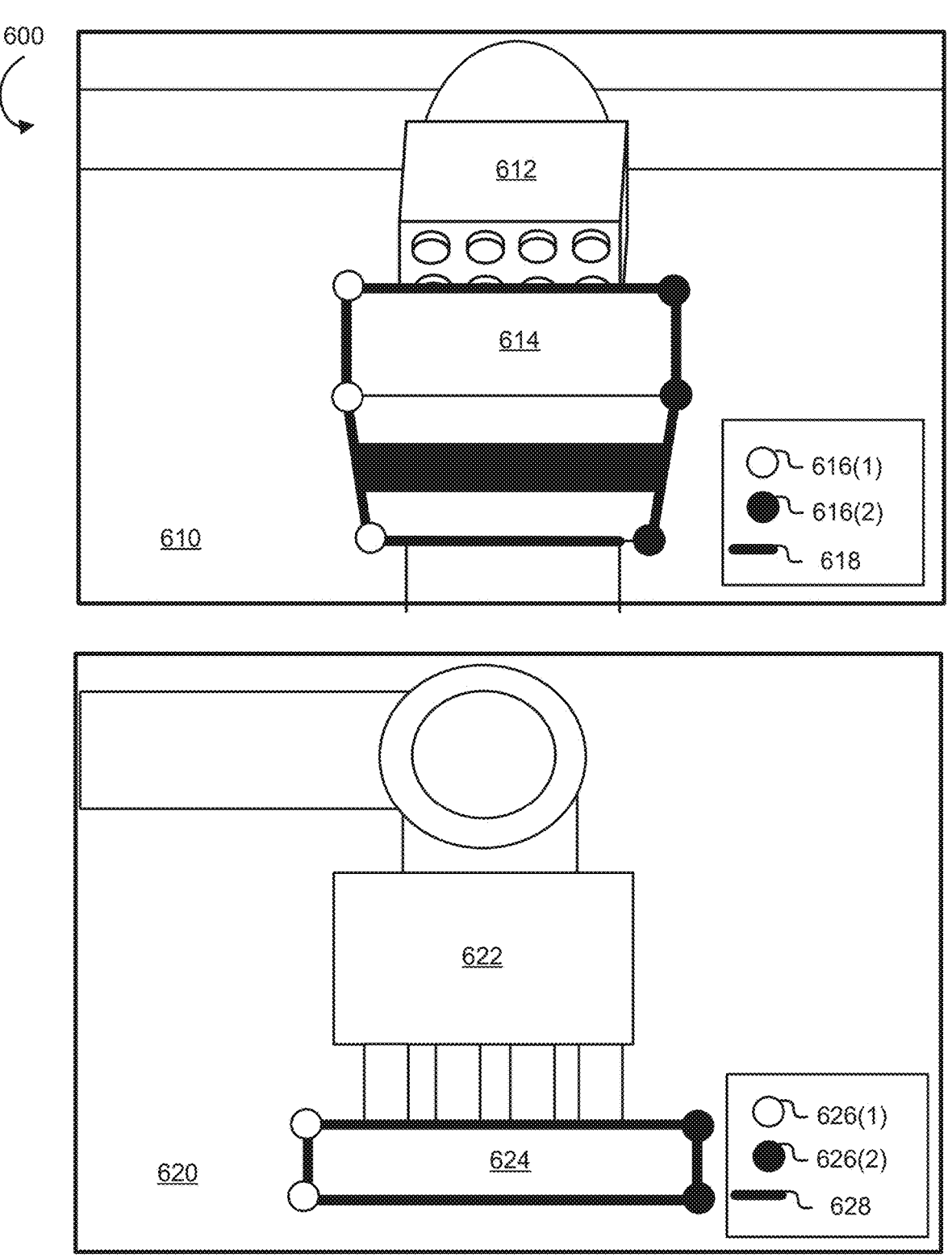
FIG. 6 illustrates an example of corner determination using images with different viewpoints, in accordance with at least one embodiment.

FIG. 6 illustrates an example 600 of corner determination using images with different viewpoints. Example 600 may include first image 610 that was captured from a camera that is located in the bottom front of an object (e.g., object 614).

Also, example 600 may include second image 620 that is located in the left side of the object (e.g., object 624). Object 614 and 624 can be the same object. First image 610 can be first image 410 illustrated in FIG. 4 and second image 620 can be second image 420 illustrated in FIG. 4. Object 614 can be object 414 illustrated in FIG. 4 and object 624 can be object 424 illustrated in FIG. 4. First image 610 can be first image 510 illustrated in FIG. 5 and second image 620 can be second image 520 illustrated in FIG. 5. Object 614 can be object 514 illustrated in FIG. 5 and object 624 can be object 524 illustrated in FIG. 5. First image 610 may depict end effector 612 of a robotic arm that picks up object 614. Second image 620 may depict end effector 622 of a robotic arm that picks up object 624. End effector 612 can be the same as end effector 622.

After identifying the edges (e.g., first edges 618, second edges 628), systems such as object estimator 344 and object estimator 1202 may intersect the edges to generate corners of the object (e.g., object 614, object 624). First edges 618 can be first edges 516 illustrated in FIG. 5 and second edges 628 can be second edges 526 illustrated in FIG. 5. The systems may only leave the corners if the corner is in the original polygon, simplified polygon, or extended polygon which was generated as a result of inflating the original polygon by a small amount (e.g., $tol_c=5$ pixels). Inflation may refer to over-estimation of a volume (e.g., about 5%) compared to ground truth data (e.g., prior estimations that were verified as correct). The systems can add four extreme points (e.g., leftmost, rightmost, highest, lowest) of the simplified polygon if these four points are not added as a result of intersecting the edges.

The systems can indicate (e.g., highlight, annotate, or otherwise mark) first corners 616(1) as 'seen from left camera' and first corners 616(2) as 'seen from right camera' in first image 610. The systems can indicate second corners 626(1) as 'seen from left camera' and second corners 626(2) as 'seen from right camera' in second image 620. To make those indications, the systems find a centroid of the polygon (e.g., simplified, original, extended) and determine whether he corners are in the left side or right side of the centroid.

Alternatively, to indicate the corners, the systems may identify relative shape and poses of the left and right cameras with respect to the current camera. It could be the same camera (as the current camera) in a different location to take the object with a different viewpoint. Then, the systems may identify the projection of the Z axis of the left camera (or perspective) on the X and Y axis of the current camera. The systems may compute the angle of the projection with the current Y axis (horizontal line in the γ current image space). The systems may rotate the corners γ degrees in the image space around the center. The systems may traverse (by starting from the topmost corner) on the left side through corners until the lowest corner is reached and may mark all these corners as seen from the left. The systems may exclude the lowest and highest corners from marking if they are within a small vertical distance (e.g., $thr_{crnr}$) from the next corner on their left. The systems may repeat the same process for the right camera and mark the corner on the right as seen from the right. In another way, the systems may use one or more neural networks to identify and indicate first corners 616(1) and 616(2) and second corners 626(1) and 626(2).

Figure 7:
FIG. 7 illustrates an example of line projection and intersection identification in 3-dimensional (3D) space, in accordance with at least one embodiment.

FIG. 7 illustrates an example 700 of line projection and intersection identification in 3-dimensional (3D) space. Systems such as object estimator 344 and object estimator 1202 may generate lines in 3D space that project from the center of different viewpoints through the corners (e.g., first corners 616(1) and 616(2) and second corners 626(1) and 626(2) illustrated in FIG. 6) in the end of arm tooling (EoAT) coordinate frames. The systems may further intersect all the 3D lines with each other to generate intersection points. Specifically, the systems may identify points where two lines are the closest and define an intersection point as the point between those closest point if their distance is less than a threshold (e.g., $I_{thr}^I = 0.01$ m). Intersection may happen with lines that are not parallel (e.g., having an angle of at least $a_{thr}^I$ degrees with each other). The dots illustrated in example 700 can be remaining intersection points generated as a result of line projection and intersection identification in 3D space.

Figure 8:
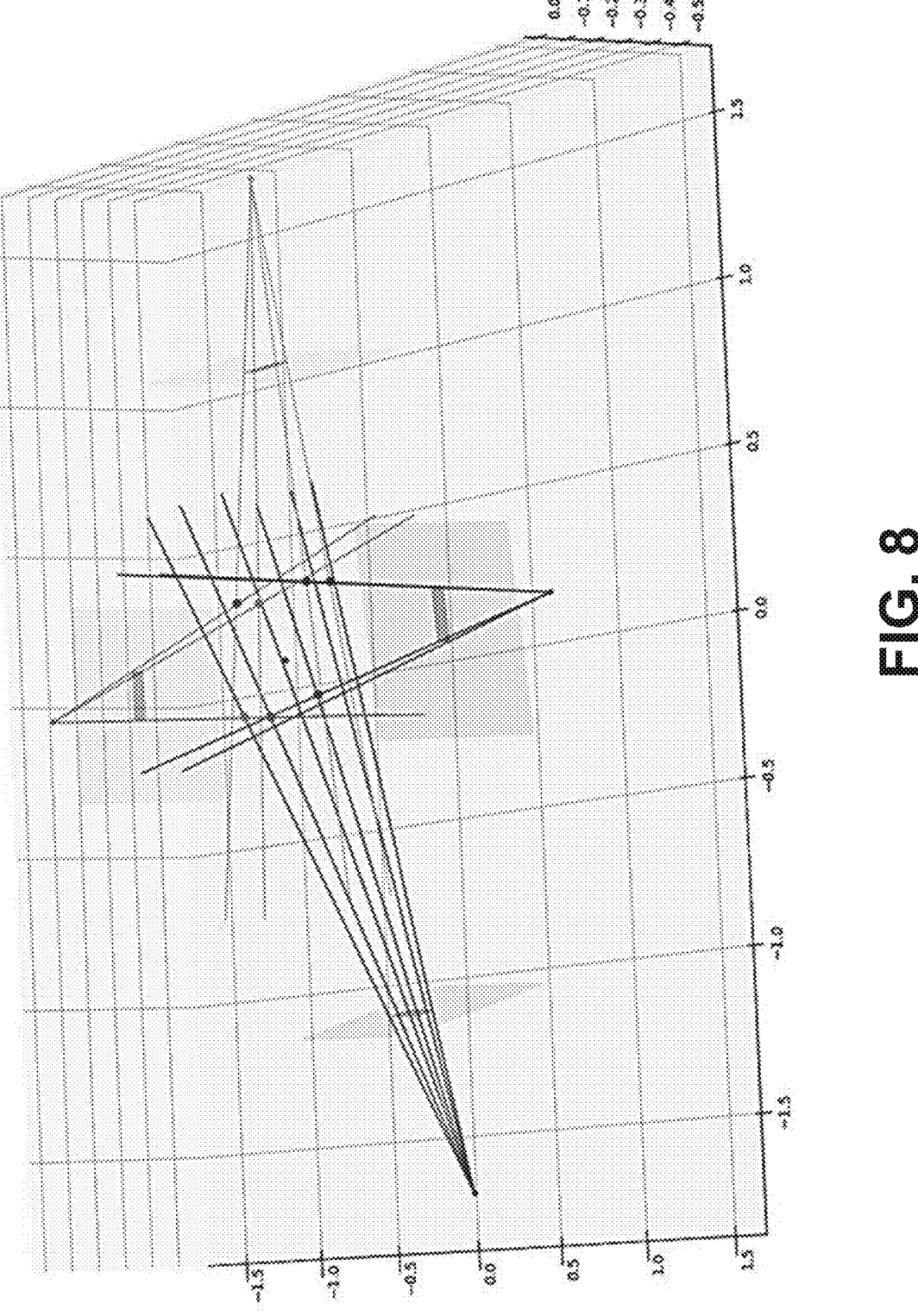
FIG. 8 illustrates an example of intersection pruning, in accordance with at least one embodiment.

FIG. 8 illustrates an example 800 of intersection pruning. After systems such as object estimator 344 and object estimator 1202 identify intersection points by performing techniques described in conjunction with FIG. 7, the systems may remove intersection points that are outside of region of interest (ROI). ROI may refer to a specific segment of an image, frame, or data set that is selected for further analysis or processing. ROI can be determined by user input. Example ROI can be $1.5 \times 1.5 \times 2$ m$^3$ and $1 \times 1 \times 1$ m$^3$ in EoAT coordinates. Another example ROI can be determined based on previous estimates that accurately estimates different objects or an average of previous estimates that were generated. ROI can also be determined using statistical data on objects processed in warehouses or other distribution centers or based on the standard shapes of objects required for business or regulatory reasons.

Additionally, the system may keep the points that are the result of intersecting lines on the correct sides of at least two viewpoints. In particular, the system may keep an intersection point if it is the result of lines passing through a corner marked as 'seen from left' on the right viewpoint or camera and a corner marked as 'seen from right' on the left viewpoint or camera. Alternatively, the system may keep intersected points resulting from similar viewpoints. The remaining dots illustrated in example 800 are remaining intersection points after the pruning process.

Alternatively, the system may remove the points using other techniques. For example, for every 3D line that has at least one intersection, the system may remove intersection points except the one that is the closest to the viewpoint or the camera that the 3D line is projected from. In another example, for every 3D line that has at least one intersection, the system may identify a portion of the 3D line that enters the ROI and ends at an intersection point. The system may project the portion to 2D space of the other line in that intersection. Specifically, if a line belongs to a first viewpoint, the line can be projected to an image from a second viewpoint. Subsequently, the system may determine whether the projected portion intersects with a vertex in the simplified polygon illustrated in FIGS. 4-6, and prune other intersections belonging to the 3D line if the projected portion intersects with a vertex other than the one that it should be. Alternatively, the system may keep all the points.

In at least one embodiment, the system may cluster intersection points that are close to each other. This may include treating clustered intersections as a single positioned at a center of the points in the cluster. For example, some intersection points can be subject to clustering if the distance between the points are within a certain threshold (e.g., $e_{thr}^c$). The system may keep all clusters or only keep the most prolific clusters (e.g., the clusters with most points). The remaining intersection points or clusters can be used to generate candidate estimations of objects, which are further described in conjunction with block 1116 illustrated in FIG. 11.

Figure 9:
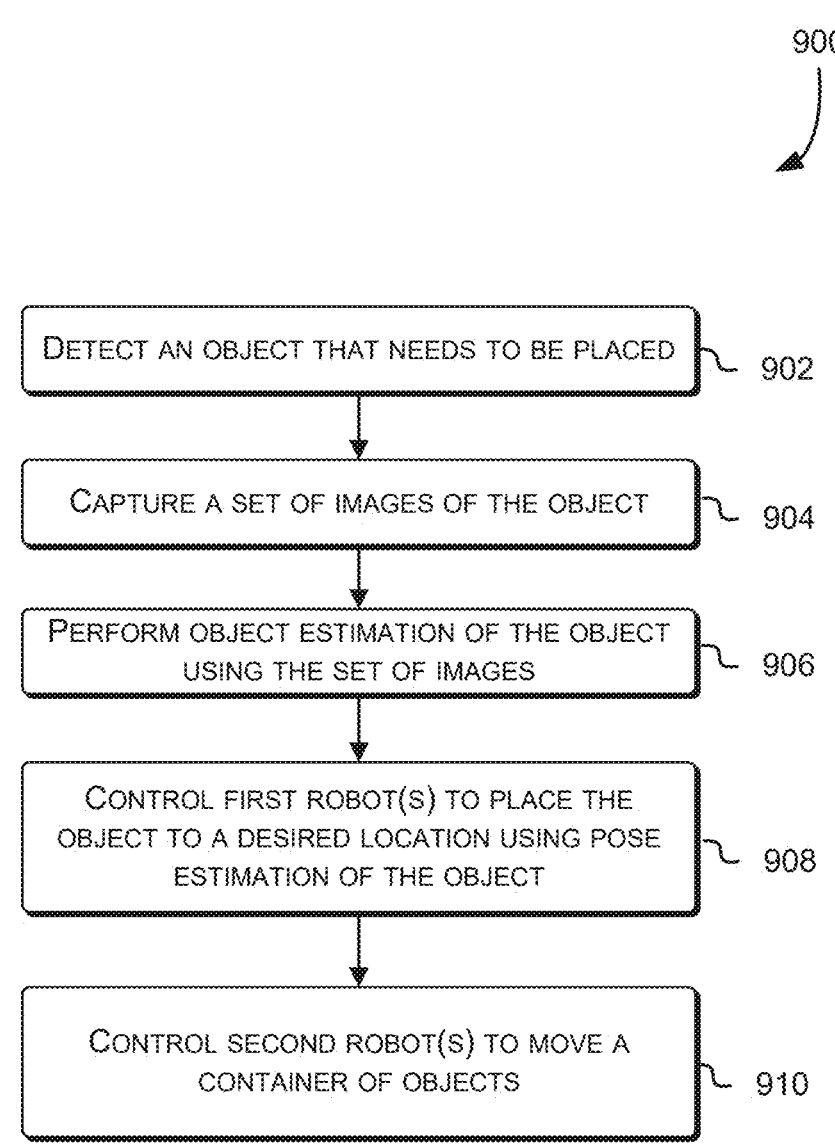
FIG. 9 illustrates an example process to place objects in a location, in accordance with at least one embodiment.

FIG. 9 illustrates an example process 900 to place objects to a location, in accordance with at least one embodiment. Although process 900 is depicted as a series of steps or operations, it will be appreciated that at least one embodiment of process 900 includes altered or reordered steps or operations, or omits certain steps or operations, except where explicitly noted or logically required, such as when an output of one step or operation is used as input for another. One or more entities described in conjunction with FIGS. 1-3 and 12, singly or in any combination, perform each block of process 800. For example, the one or more entities may include environment 100, environment 200, environment 300, and environment 1200. The one or more entities may further include, for example, one or more of hardware, firmware, and/or software described in conjunction with FIG. 3.

Various functions can be carried out by a processor executing instructions stored in memory (e.g., computer readable, machine readable) to perform process 900. Also, process 900 may be implemented as computer-usable instructions (e.g., macro instruction, micro-instruction) stored on computer storage media or provided by a standalone application, a service or hosted service (standalone or in combination with another hosted service).

At block 902, the one or more entities may detect an object that needs to be placed. The object can enter a robot workcell through a conveyor belt in a warehouse. The one or more entities may detect the object using different sensors such as, for example, Light Detection and Ranging (LiDAR), motion sensors, infrared sensors, photoelectric sensors, ultrasonic sensors, pressure mats, capacitive sensors, laser scanners, etc. The one or more entities may detect the object by scanning for example QR code or barcode that is associated with the object.

At block 904, the one or more entities may capture a set of images of the object. The one or more entities may use fixed cameras that are located in different locations such that the fixed cameras can capture the object in different viewpoints (e.g., front, back, left, right). Instead, the one or more entities may use moving cameras that can move around a robot workcell to capture the object in different viewpoints.

At block 906, the one or more entities may perform object estimation of the object using the set of images. The one or more entities may perform object estimation by performing at least one block of process 1100 in conjunction with image processor 342, object estimator 344, and NN module 346 illustrated in FIG. 3. As a result of performing block 906, the one or more entities may generate different examples such as example 400, example 500, example 600, example 700, and/or example 800 illustrated in FIGS. 4-8.

At block 908, the one or more entities may control first robots to place the object to a desired location using object estimation of the object performed in block 906. The first robots may refer to robot arms that are part of a robot workplace, where the robot arms can pick up and place objects in different locations (e.g., containers). The one or more entities may receive geometric information of a container and other objects that are inside the container. The geometric information of the container and other objects can be generated using the same object estimation. Based on the geometric information of the container and other objects and also the object estimation of the object, the one or more entities may select which container among other containers in the robot workcell to place the object in and where in the selected container to place the object.

At block 910, the one or more entities may control second robots to move a container that includes the object. The second robots may refer to autonomous carts that move containers. The one or more entities may determine that a particular container of the group of containers is full of objects, so the robot workcell needs an empty container to place objects. The one or more entities may include different sensors described in conjunction with block 902 to make the determination. After making the determination, the one or more entities may generate control signals that causes second robots to move the full container that includes the object to another place in the warehouse or outside the warehouse.

Figure 10:
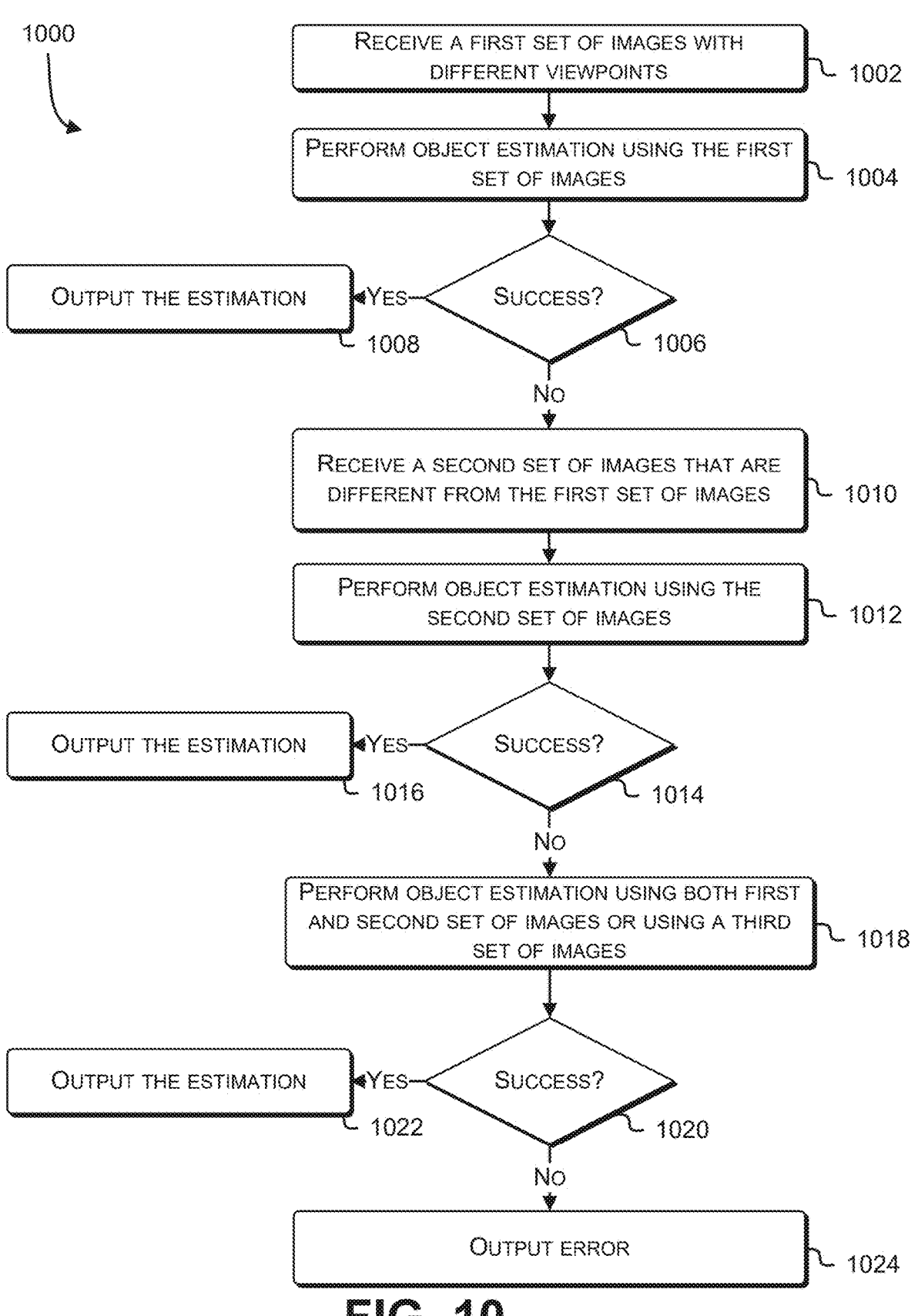
FIG. 10 illustrates an example process to perform object estimation, in accordance with at least one embodiment.

FIG. 10 illustrates an example process 1000 to perform object estimation. Although process 1000 is depicted as a series of steps or operations, it will be appreciated that at least one embodiment of process 1000 includes altered or reordered steps or operations, or omits certain steps or operations, except where explicitly noted or logically required, such as when an output of one step or operation is used as input for another. One or more entities described in conjunction with FIGS. 1-3 and 12, singly or in any combination, perform each block of process 1000. For example, the one or more entities may include environment 100, environment 200, environment 300, and environment 1200. The one or more entities may further include, for example, one or more of hardware, firmware, and/or software described in conjunction with FIG. 3.

Various functions can be carried out by a processor executing instructions stored in memory (e.g., computer readable, machine readable) to perform process 800. Also, process 1000 may be implemented as computer-usable instructions (e.g., macro instruction, micro-instruction) stored on computer storage media or provided by a stand-alone application, a service or hosted service (standalone or in combination with another hosted service).

At block 1002, the one or more entities may receive a first set of images with different viewpoints. The one or more entities may include cameras that are fixed in different locations to capture the images with different viewpoints or include cameras that can change locations (e.g., rotate 360 degrees) to capture the images with different viewpoints.

At block 1004, the one or more entities may perform object estimation using the first set of images. To perform the object estimation, the one or more entities may perform one or more blocks of process 1100 illustrated in FIG. 11.

At block 1006, the one or more entities may determine whether the object estimation is successful. The determination may depend on whether the estimation with the highest score exceeds a threshold. In addition, the determination may depend on whether the one or more entities can successfully perform blocks 1102-1122. If the object estimation is successful, process 1000 can move to 1008. If not, then process 1000 can move to 1010.

At block 1008, the one or more entities may output the object estimation. Based on the object estimation, the one or more entities can generate control signals to cause a robotic arm in a robot workcell to place an object to a container. The one or more entities can generate additional control signals to cause autonomous robots to move the container to another location.

At block 1010, the one or more entities may receive a second set of images that are different from the first set of images. The second set of images can be images that are captured in a different time frame compared to the first set of images. The second set of images can be images that are captured using different cameras. The second set of images can be images with viewpoints different from the viewpoints of the first set of images.

At block 1012, the one or more entities may perform a second object estimation using the second set of images. To perform the second object estimation, the one or more entities may perform one or more blocks of process 1100 illustrated in FIG. 11.

At block 1014, the one or more entities may determine whether the second object estimation is successful. The determination may depend on whether the estimation with the highest score exceeds a threshold. In addition, the determination may depend on whether the one or more entities can successfully perform blocks 1102-1122. If the second object estimation is successful, process 1000 can move to 1016. If not, then process 1000 can move to 1018.

At block 1016, the one or more entities may output the second object estimation. Based on the second object estimation, the one or more entities can generate control signals to cause a robotic arm in a robot workcell to place an object to a container. The one or more entities can generate additional control signals to cause autonomous robots to move the container to another location.

At block 1018, the one or more entities may perform a third object estimation using both the first set of images and the second set of images. In addition, the one or more entities can use a third set of images, where the third set of images can be images that are captured in a different time frame compared to the first set of images and/or second set of images. The third set of images can be images that are captured using different cameras. The third set of images can be images with viewpoints different from the viewpoints of the first set of images and/or the second set of images. To perform the third object estimation, the one or more entities may perform one or more blocks of process 1100 illustrated in FIG. 11.

At block 1020, the one or more entities may determine whether the third object estimation is successful. The determination may depend on whether the estimation with the highest score exceeds a threshold. In addition, the determination may depend on whether the one or more entities can successfully perform blocks 1102-1122. If the third object estimation is successful, process 1000 can move to 1022. If not, then process 1000 can move to 1024.

At block 1022, the one or more entities may output the third object estimation. Based on the third object estimation, the one or more entities can generate control signals to cause a robot in a robot workcell to place an object to a container. The one or more entities can generate additional control signals to cause autonomous robots to move the container to another location.

At block 1024, the one or more entities may output an error, such as an error message. As a result, the one or more entities may perform other techniques (e.g., space carving) to perform object estimation. As a result of performing at least one block of process 1000, the one or more entities may generate different examples such as example 400, example 500, example 600, example 700, and/or example 800 illustrated in FIGS. 4-8.

FIG. 11 illustrates another example process 1100 to perform object estimation. Although process 1100 is depicted as a series of steps or operations, it will be appreciated that at least one embodiment of process 800 includes altered or reordered steps or operations, or omits certain steps or operations, except where explicitly noted or logically required, such as when an output of one step or operation is used as input for another. One or more entities described in conjunction with FIGS. 1-3 and 12, singly or in any combination, perform each block of process 800. For example, the one or more entities may include environment 100, environment 200, environment 300, and environment 1200. The one or more entities may further include, for example, one or more of hardware, firmware, and/or software described in conjunction with FIG. 3.

Various functions can be carried out by a processor executing instructions stored in memory (e.g., computer readable, machine readable) to perform process 1100. Also, process 1100 may be implemented as computer-usable instructions (e.g., macro instruction, micro-instruction) stored on computer storage media or provided by a stand-alone application, a service or hosted service (standalone or in combination with another hosted service).

At block 1102, the one or more entities may receive a set of images that are captured from different viewpoints. The set of images can be generated by different cameras that surround the object. Alternatively, the set of images can be generated by a subset of cameras that rotate the object. The set of images can include videos (that capture the object in different time frames and/or viewpoints).

At block 1104, the one or more entities may perform segmentation from the set of images. The one or more entities may use one or more neural networks that can be trained by NN module 346 illustrated in FIG. 3 to perform image segmentation to generate a polygon of the set of images. The polygon corresponds to the object depicted in the set of images. The one or more entities may generate a simplified polygon by traversing points of the polygon and removing some of the points that have an angle of less than a threshold between incoming and outgoing edges.

At block 1106, the one or more entities may determine edges and external corners of an object based on the segmentation. The one or more entities may use the simplified polygon to identify six longest edges by neighboring point pairs in the simplified polygon with farthest distances. The one or more entities may ignore edges that are shorter than a threshold. The one or more entities may indicate (e.g., highlight, annotate, or otherwise mark) the identified edges. Based on the edges, the one or more entities may intersect the edges to generate corners of the object depicted in the set of images. The one or more entities may extend the simplified polygon to generate the corners. For example, the one or more entities may extend by inflating the original polygon by a threshold. Then, the one or more entities may leave the corners if the corner is within any of the original polygon, simplified polygon, or extended polygon.

At block 1108, the one or more entities may indicate corners if they can be seen from each of the other cameras. The one or more entities may indicate a first subset of generated corners as 'seen from left camera' and a second subset of generated corners as 'seen from right camera.' The one or more entities may identify a centroid of the polygon (e.g., simplified, original, extended) and determine whether the corners are in the left side or right side of the centroid. Additionally, the one or more entities may identify relative poses of the cameras that took images with different but neighboring viewpoints with respect to the current viewpoint. Then, one or more entities may identify the projection of the Z axis of the left viewpoint on the X and Y axis of the current viewpoint. The one or more entities may compute the angle of the projection with the current Y axis (horizontal line in the γ current image space). The one or more entities may rotate the corners γ degrees in the image space around the center. The one or more entities may traverse from the topmost corner on the left side through corners until the lowest corner is reached and may mark all these corners as seen from the left. The one or more entities may exclude the lowest and highest corners from marking if they are within a small vertical distance from the next corner on their left. The one or more entities may repeat the same process for the right camera and mark the corner on the right as seen from the right.

At block 1110, the one or more entities may project 3D lines from the center of the camera through the image corners to the coordinate frames. The one or more entities may generate lines in 3D space that project from the center of different viewpoints through the corners to the EoAT coordinate frames.

At block 1112, the one or more entities may identify a set of points based on intersecting 3D lines. The one or more entities may intersect all the 3D lines with each other to generate intersection points. Specifically, the one or more entities may identify points where two lines are the closest and define an intersection point as the point between those closest point if their distance is less than a threshold.

At block 1114, the one or more entities may select a subset of points from the set of points. The one or more entities may remove intersection points that are outside of region of interest (ROI). ROI may refer to a specific segment of an image, frame, or data set that is selected for further analysis or processing. ROI can be determined by user input.

Besides, the one or more entities may keep the points that are the result of intersecting lines on the correct sides of at least two viewpoints. In particular, the one or more entities may only keep an intersection point if it is the result of lines passing through a corner marked as 'seen from left' on the right viewpoint or camera and a corner marked as 'seen from right' on the left viewpoint or camera. Alternatively, the system may keep intersected points resulting from similar viewpoints.

In at least one embodiment, the one or more entities may remove the points using other techniques. For example, for every 3D line that has at least one intersection, the system may remove intersection points except the one that is the closest to the viewpoint or the camera that the 3D line is projected from. In another example, for every 3D line that has at least one intersection, the one or more entities may identify a portion of the 3D line that enters the ROI and ends at an intersection point. The one or more entities may project the portion to 2D space of the other line in that intersection. Specifically, if a line belongs to a first viewpoint, the line can be projected to an image from a second viewpoint. Subsequently, the one or more entities may determine whether the projected portion intersects with a vertex in the simplified polygon illustrated in FIGS. 4-6, and may prune other intersections belonging to the 3D line if the projected portion intersects with a vertex other than the one that it should be. In some examples, the one or more entities may keep all the points.

In various examples, the one or more entities may cluster intersection points that are close to each other. This may include treating clustered intersections as a single positioned at a center of the points in the cluster. For example, some intersection points can be subject to clustering if the distance between the points are within a certain threshold (e.g., $e_{thr}{}^c$). The one or more entities may keep all clusters or only keep the most prolific clusters (e.g., the clusters with most points).

At block 1116, the one or more entities may generate a set of estimations based on the subset of points. For each combination of four points of the subset of points, the one or more entities may generate at least six vectors from two of the four points. The one or more entities may determine whether three vectors of the six vectors are orthogonal to each other by computing angle between different vectors to see if the angle meets the threshold (e.g., $a_{thr}{}^{o}$, =5). In some examples, the one or more entities may determine the length of the vector and compare with ground truth (e.g., expected box dimensions) to identify the estimation without the scoring process described further herein.

In at least one embodiment, if the one or more entities determine that they are orthogonal, the one or more entities heuristically generate all eight points of a candidate estimation from the four points. Specifically, the one or more entities may determine that there is one point that is part of all three orthogonal vectors and there are two points that share one of the three orthogonal vectors, where each of the two vectors is connected to the two of the three orthogonal vectors. If there are no orthogonal vectors generated, the one or more entities may move to next combination of four points of the subset of points.

The one or more entities may return failure or error if none is generated. The one or more entities may discard other estimations if the number of estimations is more than a threshold (e.g., $n_{thr}{}^{c}$=35). This can be done as a result of using different sets of images (e.g., block 1018).

At block 1118, the one or more entities may determine a score of each estimation of the set of estimations. To determine the score, the one or more entities may project each estimation to all of the images. Specifically, the one or more entities may project eight vertices of the estimation to the image space and compute 2D convex hull to obtain the projection polygon. The one or more entities may compare the projection polygon with the polygons generated as a result of image segmentation in block 1104, block 1106, and/or block 1108 by determining intersection of union (IOU) of the projected polygon with the polygons generated as a result of image segmentation; intersecting projected polygon with the polygons generated as a result of image segmentation and/or object depicted in the images. IOU refers to a measure that calculates the overlap between estimation and the expected ground truth. IOU can be the area of intersection divided by the area of union, where the intersection refers to the area of overlap between the estimation (e.g., projected polygon) and the expected ground truth (e.g., polygons generated as a result of image segmentation in 2D), and the union refers to total area covered by both the estimation and the expected ground truth.

In various examples, in addition to the scoring based on the IOU, the one or more entities may perform additional scoring based on how close estimations and ground truth are. Ground truth can be generated based on prior knowledge of the dimensions of the object.

At block 1120, the one or more entities may identify an estimation with the highest score. Before identifying the highest score, remove all the estimations that have a score lower than a certain percentile (e.g., $s_{thr}{}^{P}$=20%). This is to avoid selecting the ones with low quality. If there are none that can be selected, the one or more entities may output an error.

At block 1122, the one or more entities may determine whether the score of the identified estimation is above a threshold (e.g., $S_{thr}{}^{b}$=0.85). If the identified estimation is above the threshold, process 1100 can move to block 1124. If not, then process 1100 can move to block 1126.

At block 1124, the one or more entities may return the identified estimation. Specifically, the one or more entities may generate an oriented bounding box (OBB) to the estimations. The one or more entities may initialize the smallest volume as infinity and, at each round, generate all the possible rotation with the current sweep range and sweep step. Then, for each rotation, the one or more entities may apply rotation to the vertices of the estimation in addition to the best rotation from the previous iteration. The one or more entities may compute the axis-aligned bounding box (AABB) for the rotated points. If its volume is smaller than the previous smallest volume, the one or more entities may update the volume and record the box (rotation, translation, dimensions). The one or more entities may reduce the sweep range to slightly larger than the sweep size and reduce the sweep step and may update the best rotation. The one or more entities may repeat the process unless the sweep step is below the desired minimum.

After sending the identified estimation, the one or more entities can perform block 908 and/or block 910 illustrated in FIG. 9. At block 1126, the one or more entities return error. After sending an error message, the one or more entities can perform block 1006 or block 1014 illustrated in FIG. 11. As a result of performing at least one block of process 1100, the one or more entities may generate different examples such as example 400, example 500, example 600, example 700, and/or example 800 illustrated in FIGS. 4-8.

Figure 12:
FIG. 12 illustrates an example environment of placing objects to different containers with or without object estimation, in accordance with at least one embodiment.

FIG. 12 illustrates an environment 1200 of placing objects to different containers with or without object estimation, in accordance with at least one embodiment. Environment 1200 may include a robotic system that packs, stacks, organizes, or otherwise places more objects in a second container 1214 with object estimation of the objects compared to packing objects in a first container 1224 without object estimation of the objects. The robotic system includes object estimator 1202, robot 1212, first container 1224, second container 1214, first autonomous robot 1226, and second autonomous robot 1216. Environment 1200 illustrates that objects can be packaged, organized, or otherwise placed in a container such that there is limited (e.g., zero) space between packages or a small amount of space (e.g., a few inches or centimeters) so that a robot can access the objects in the container. One advantage of the disclosed techniques is that objects are more efficiently organized in a container (e.g., limited open space).

In at least one embodiment, when robot 1212 in a workcell places objects in first container 1224 without object estimator 1202, robot 1212 cannot accurately assess diverse shape (e.g., height, width) and pose (e.g., dimensions and orientations) of objects with varying shape. Without a detailed understanding of each object's geometry, robot 1212 cannot organize, stack, pack, or otherwise place the objects in first container 1224 as tightly as possible while preventing any damage or unwanted alterations to objects within containers (e.g., first container 1224, second container 1214). The consequence can be additional container movements made by first autonomous robot 1226 within or outside a warehouse. Autonomous robots (e.g., first autonomous robot 1226, second autonomous robot 1216) may refer to robots (e.g., carts) that move such things as containers. Alternatively, containers can be part of the robot.

In at least one embodiment, object estimator 1202 may refer to a module to perform high-quality object estimation of objects that are to be placed in a container (e.g., second container 1214 using various techniques described herein. Object estimator 1202 may perform one or more blocks of process 900, process 1000, and/or process 1100. Object estimator 1202 may generate example 400, example 500, example 600, example 700, and/or example 800 illustrated in FIGS. 4-8 as a result of performing at least one block of process 900, process 1000, and/or process 1100 illustrated in FIGS. 9-11. Also, object estimator 1202 may include object estimator 344 illustrated in FIG. 3.

In at least one embodiment, robot 1212 can accurately assess diverse dimensions, positions, and orientations of objects with varying shape when robot 1212 in the workcell places objects in container while performing object estimation using object estimator 1202. As a result, robot 1212 can pack the objects in second container 1214 as tightly as possible. The consequence can be less container movements made by second autonomous robot 1216 within or outside a warehouse.

FIG. 13 illustrates aspects of an example system 1300 for implementing aspects in accordance with an embodiment. As will be appreciated, although a web-based system is used for purposes of explanation, different systems may be used, as appropriate, to implement various embodiments. In an embodiment, the system includes an electronic client device 1302, which includes any appropriate device operable to send and/or receive requests, messages, or information over an appropriate network 1304 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1306 for receiving requests and serving content in response thereto, although for other networks an alternative device serving a similar purpose could be used as would be apparent to one of ordinary skill in the art.

In an embodiment, the illustrative system includes at least one application server 1308 and a data store 1310, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software, and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1302 and the application server 1308, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1310, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1312 and user information 1316, which are used to serve content for the production side. The data store also is shown to include a mechanism for storing log data 1314, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1310.

The data store 1310, in an embodiment, is operable, through logic associated therewith, to receive instructions from the application server 1308 and obtain, update or otherwise process data in response thereto, and the application server 1308 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1302. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1300 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1300, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The system can be part of computer systems 330 illustrated in FIG. 3. The system can be used to perform one or more blocks of processes illustrated in FIGS. 9-11. At least one embodiment of the disclosure can be described in view of the following clauses:

1. A computer-implemented method, comprising: obtaining a set of images that is captured from different viewpoints, wherein the set of images depicts an object; identifying a plurality of corners of the object in the set of images as a result of performing image segmentation on the set of images; generating a plurality of lines in 3-dimensional (3D) space that project from the different viewpoints through the plurality of corners of the object in the set of images; identifying a first set of intersection points using the plurality of lines in 3D space; selecting a second set of intersection points from the first set of intersection points in response to determining that the second set of intersection points is within a region of interest (ROI); generating a plurality of estimations of the object using the second set of intersection points, wherein the plurality of estimations indicates shape and pose of the object; selecting, from the plurality of estimations, an estimation that corresponds to a highest score; and identifying a location in a container to place the object in using the selected estimation of the object.

2. The computer-implemented method of clause 1, further comprising: generating first control signals that cause a first robot to place the object in the container, wherein the container includes a plurality of objects; and generating second control signals that cause a second robot to place the container into a different location.

3. The computer-implemented method of clause 1 or 2, wherein identifying the location of the container further comprises: identifying how one or more other objects in the container are placed using information of the one or more other objects and the container; and determining an area within the container that the object is to be placed.

4. The computer-implemented method of any one of clauses 1-3, wherein the shape of the object indicates length, width, or height of the object.

5. A system, comprising: one or more processors; memory that stores computer-executable instructions that, if executed, cause the one or more processors to: receive a plurality of images that is captured from a plurality of viewpoints, where the plurality of images includes an object; identify a plurality of corners of the object based, at least in part, on performing image segmentation of the plurality of images; determine a plurality of 3-dimensional (3D) lines that project from at least the plurality of corners through center of the plurality of viewpoints; identify a plurality of points based, at least in part, on intersecting at least two of the plurality of 3D lines; generate a plurality of representations of the object based, at least in part, on the plurality of points; select a representation from the plurality of representations based, at least in part, on a threshold; and cause one or more robots to move the object to a location in a container based, at least in part, on the selected representation.

6. The system of clause 5, wherein the computer-executable instructions that cause the system to identify the plurality of corners of the object further comprise computer-executable instructions that, if executed by the one or more processors, cause the system to: indicate edges of the object based, at least in part, on the image segmentation of the plurality of images; and identify the plurality of corners of the object based, at least in part, on the edges.

7. The system of clause 5 or 6, wherein the computer-executable instructions that cause the system to identify the plurality of points further comprise computer-executable instructions that, if executed by the one or more processors, cause the system to: identify a portion of at least two of the plurality of 3D lines that is within the region of interest (ROI); and remove a point of two or more points in the portion, wherein a remaining point of the two or more points is part of the plurality of points;

8. The system of any one of clauses 5-7, wherein at least one of the plurality of points are identified as a result of grouping a set of points based, at least in part, on distance between each of the set of points.

9. The system of any one of clauses 5-8, wherein the computer-executable instructions that cause the system to identify the plurality of representations further comprise computer-executable instructions that, if executed by the one or more processors, cause the system to: identify a subset of the plurality of points; generate connections from at least two of the subset of the plurality of points; and determine that the connections are orthogonal to each other.

10. The system of any one of clauses 5-9, wherein the computer-executable instructions that cause the system to select a representation from the plurality of representations further comprise computer-executable instructions that, if executed by the one or more processors, cause the system to: compare the plurality of representations of the object with indications generated as a result of the image segmentation performed on the plurality of images; identify a score based, at least in part, on the comparison; and determine whether the score exceeds the threshold.

11. The system of any one of clauses 5-10, wherein the threshold is associated with a intersection of union (IOU) score that indicates quality of the plurality of representations.

12. The system of any one of clauses 5-12, wherein the one or more robots are in a warehouse including other robots to move the container to a different location in the warehouse or outside the warehouse.

13. A non-transitory computer-readable storage medium storing thereon executable instructions that, as a result of being executed by one or more processors of a computer system, cause the computer system to at least: identify an object that is located in a first location; receive two or more images depicting the object from different viewpoints; identify sets of boundaries of the object in the two or more images; identify two or more corners of the object using the sets of boundaries; generate a set of lines that are projected from the different viewpoints through the two or more corners of the object; identify two or more intersections based, at least in part, on the set of lines; identify two or more estimations of the object using the two or more intersections of at least two of the set of lines; select a highest score from the two or more estimations; and place the object in a second location based, at least in part, on an estimation associated with the highest score.

14. The non-transitory computer-readable storage medium of clause 13, wherein the instructions further comprise instructions that, as a result of being executed by the one or more processors, cause the computer system to: identify that a container is located in the second location, wherein the container comprises one or more other objects; and identify an area to place the object in the container based, at least in part, on information of the container and the object, wherein the information indicates how the one or more objects are stacked in the container.

15. The non-transitory computer-readable storage medium of clause 13 or 14, wherein the instructions that cause the computer system to identify the two or more intersections further include instructions that cause the computer system to: determine that the two or more intersections are in a region of interest (ROI) that are determined based, at least in part, on user input; and determine that the two or more intersections are associated with at least two of the set of lines that are generated by using different types of indications.

16. The non-transitory computer-readable storage medium of any one of clauses 13-15, wherein the instructions that cause the computer system to select the estimation that has the highest score further include instructions that cause the computer system to: compare the two or more estimations with the set of boundaries; and generate one or more scores of the two or more estimations based, at least in part, on the comparison, wherein the one or more scores indicate how the two or more estimations are close with the set of boundaries.

17. The non-transitory computer-readable storage medium of any one of clauses 13-16, wherein the two or more estimations indicate length, width, or height dimensions of the object and an orientation of the object.

18. The non-transitory computer-readable storage medium of any one of clauses 13-17, wherein the two or more images are captured using two or more cameras.

19. The non-transitory computer-readable storage medium of any one of clauses 13-18, wherein the different viewpoints correspond to a single camera that moves to capture the different viewpoints.

20. The non-transitory computer-readable storage medium of any one of clauses 13-19, wherein the instructions further comprise instructions that, as a result of being executed by the one or more processors, cause the computer system to cause a robot to move a container in the second location to a third location, wherein the container includes the object.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
obtaining a set of images that is captured from different viewpoints, wherein the set of images depicts an object;
identifying a plurality of corners of the object in the set of images as a result of performing image segmentation on the set of images;
generating a plurality of lines in 3-dimensional (3D) space that project from the different viewpoints through the plurality of corners of the object in the set of images;
identifying a first set of intersection points using the plurality of lines in 3D space;
selecting a second set of intersection points from the first set of intersection points in response to determining that the second set of intersection points is within a region of interest (ROI);
generating a plurality of estimations of the object using the second set of intersection points, wherein the plurality of estimations indicates shape and pose of the object;
selecting, from the plurality of estimations, an estimation that corresponds to a highest score; and
identifying a location in a container to place the object in using the selected estimation of the object.

2. The computer-implemented method of claim 1, further comprising:
generating first control signals that cause a first robot to place the object in the container, wherein the container includes a plurality of objects; and
generating second control signals that cause a second robot to place the container into a different location.

3. The computer-implemented method of claim 1, wherein identifying the location of the container further comprises:
identifying how one or more other objects in the container are placed using information of the one or more other objects and the container; and
determining an area within the container that the object is to be placed.

4. The computer-implemented method of claim 1, wherein the shape of the object indicates length, width, or height of the object.

5. A system, comprising:
one or more processors;
memory that stores computer-executable instructions that, if executed, cause the one or more processors to:

receive a plurality of images that is captured from a plurality of viewpoints, where the plurality of images includes an object;

identify a plurality of corners of the object based, at least in part, on performing image segmentation of the plurality of images;

determine a plurality of 3-dimensional (3D) lines that project from at least the plurality of corners through center of the plurality of viewpoints;

identify a plurality of points based, at least in part, on intersecting at least two of the plurality of 3D lines;

generate a plurality of representations of the object based, at least in part, on the plurality of points;

select a representation from the plurality of representations based, at least in part, on a threshold; and cause one or more robots to move the object to a location in a container based, at least in part, on the selected representation.

6. The system of claim 5, wherein the computer-executable instructions that cause the system to identify the plurality of corners of the object further comprise computer-executable instructions that, if executed by the one or more processors, cause the system to:

indicate edges of the object based, at least in part, on the image segmentation of the plurality of images; and identify the plurality of corners of the object based, at least in part, on the edges.

7. The system of claim 5, wherein the computer-executable instructions that cause the system to identify the plurality of points further comprise computer-executable instructions that, if executed by the one or more processors, cause the system to:

identify a portion of at least two of the plurality of 3D lines that is within the region of interest (ROI); and remove a point of two or more points in the portion, wherein a remaining point of the two or more points is part of the plurality of points.

8. The system of claim 5, wherein at least one of the plurality of points are identified as a result of grouping a set of points based, at least in part, on distance between each of the set of points.

9. The system of claim 5, wherein the computer-executable instructions that cause the system to identify the plurality of representations further comprise computer-executable instructions that, if executed by the one or more processors, cause the system to:

identify a subset of the plurality of points;

generate connections from at least two of the subset of the plurality of points; and determine that the connections are orthogonal to each other.

10. The system of claim 5, wherein the computer-executable instructions that cause the system to select a representation from the plurality of representations further comprise computer-executable instructions that, if executed by the one or more processors, cause the system to:

compare the plurality of representations of the object with indications generated as a result of the image segmentation performed on the plurality of images;

identify a score based, at least in part, on the comparison; and determine whether the score exceeds the threshold.

11. The system of claim 5, wherein the threshold is associated with a intersection of union (IOU) score that indicates quality of the plurality of representations.

12. The system of claim 5, wherein the one or more robots are in a warehouse including other robots to move the container to a different location in the warehouse or outside the warehouse.

13. A non-transitory computer-readable storage medium storing thereon executable instructions that, as a result of being executed by one or more processors of a computer system, cause the computer system to at least:

identify an object that is located in a first location;

receive two or more images depicting the object from different viewpoints;

identify sets of boundaries of the object in the two or more images;

identify two or more corners of the object using the sets of boundaries;

generate a set of lines that are projected from the different viewpoints through the two or more corners of the object;

identify two or more intersections based, at least in part, on the set of lines;

identify two or more estimations of the object using the two or more intersections of at least two of the set of lines;

select a highest score from the two or more estimations; and place the object in a second location based, at least in part, on an estimation associated with the highest score.

14. The non-transitory computer-readable storage medium of claim 13, wherein the instructions further comprise instructions that, as a result of being executed by the one or more processors, cause the computer system to:

identify that a container is located in the second location, wherein the container comprises one or more other objects; and identify an area to place the object in the container based, at least in part, on information of the container and the object, wherein the information indicates how the one or more objects are stacked in the container.

15. The non-transitory computer-readable storage medium of claim 13, wherein the instructions that cause the computer system to identify the two or more intersections further include instructions that cause the computer system to:

determine that the two or more intersections are in a region of interest (ROI) that are determined based, at least in part, on user input; and determine that the two or more intersections are associated with at least two of the set of lines that are generated by using different types of indications.

16. The non-transitory computer-readable storage medium of claim 13, wherein the instructions that cause the computer system to select the estimation that has the highest score further include instructions that cause the computer system to:

compare the two or more estimations with the set of boundaries; and generate one or more scores of the two or more estimations based, at least in part, on the comparison, wherein the one or more scores indicate how the two or more estimations are close with the set of boundaries.

17. The non-transitory computer-readable storage medium of claim 13, wherein the two or more estimations indicate length, width, or height dimensions of the object and an orientation of the object.

18. The non-transitory computer-readable storage medium of claim 13, wherein the two or more images are captured using two or more cameras.

19. The non-transitory computer-readable storage medium of claim 13, wherein the different viewpoints correspond to a single camera that moves to capture the different viewpoints.

20. The non-transitory computer-readable storage medium of claim 13, wherein the instructions further comprise instructions that, as a result of being executed by the one or more processors, cause the computer system to cause a robot to move a container in the second location to a third location, wherein the container includes the object.

\* \* \* \* \*